US012012801B2

(12) United States Patent
Judson et al.

(10) Patent No.: US 12,012,801 B2
(45) **Date of Patent: *Jun. 18, 2024**

(54) HARDENED OPERABLE WINDOW SYSTEMS AND METHODS

(71) Applicant: United States of America as Represented by The Secretary of The Army, Alexandria, VA (US)

(72) Inventors: John S. Judson, Vicksburg, MS (US); Jessica K. Vankirk, Vicksburg, MS (US); David V. Senior, Vicksburg, MS (US); Craig R. Ackerman, Gainesville, VA (US); Daniel Duke, Washington, DC (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,116

(22) Filed: Sep. 30, 2019

(65) Prior Publication Data

US 2023/0366258 A1 Nov. 16, 2023

(51) Int. Cl.

| | |
|---|---|
| ***E06B 5/12*** | (2006.01) |
| ***E06B 3/26*** | (2006.01) |
| ***E06B 3/46*** | (2006.01) |
| ***E06B 3/54*** | (2006.01) |
| ***E06B 3/64*** | (2006.01) |
| ***E06B 5/10*** | (2006.01) |
| ***E06B 5/11*** | (2006.01) |

(52) U.S. Cl.

CPC .............. *E06B 5/12* (2013.01); *E06B 3/2605* (2013.01); *E06B 3/4609* (2013.01); *E06B 3/5454* (2013.01); *E06B 3/64* (2013.01); *E06B 5/106* (2013.01); *E06B 5/11* (2013.01); *E06B 2003/2615* (2013.01)

(58) Field of Classification Search

CPC . E06B 5/12; E06B 3/5454; E06B 5/11; E06B 5/106; E06B 3/64; E06B 3/4609; E06B 3/2605; E06B 2003/2615

See application file for complete search history.

(56) References Cited

U.S. PATENT DOCUMENTS

| | | | | |
|---|---|---|---|---|
| 6,216,401 B1 * | 4/2001 | Emek | .................... | E06B 1/6046 49/322 |
| 6,333,085 B1 * | 12/2001 | Emek | .................... | E06B 3/2605 428/34 |
| 6,502,356 B2 * | 1/2003 | Emek | .................... | E06B 1/6046 49/322 |

(Continued)

*Primary Examiner* — Rodney Mintz

(74) *Attorney, Agent, or Firm* — Brian C. Jones

(57) ABSTRACT

Blast, ballistic, and entry resistant operable window systems include a sliding exterior glazing panel assembly, a sliding interior glazing panel assembly, an exterior frame assembly that receives the sliding exterior glazing panel assembly, an interior frame assembly that receives the sliding interior glazing panel assembly, an exterior gasket for placement between the exterior frame assembly and the wall of the building, a central gasket for placement between the exterior frame assembly and the interior frame assembly, and an interior gasket for placement between the interior frame assembly and the wall of the building. Methods of installation in a wall of a building are also provided.

20 Claims, 21 Drawing Sheets

(56) References Cited

U.S. PATENT DOCUMENTS 6,509,071 B1 * 1/2003 Emek .................... E06B 1/6046
428/34
6,764,728 B2 * 7/2004 Emek .................... E06B 1/6046
428/34
7,134,243 B2 * 11/2006 Emek .................... E06B 1/6046
52/1
7,383,666 B2 * 6/2008 Coddens ................... E06B 5/12
52/204.62
8,011,146 B2 * 9/2011 Krause .................... F41H 5/263
52/235
8,151,525 B2 * 4/2012 Coddens ................... E06B 5/12
52/204.62
8,291,657 B2 * 10/2012 White ..................... E06B 5/106
109/49.5
8,590,227 B2 * 11/2013 Coddens ................... E06B 5/12
49/504
8,789,324 B2 * 7/2014 Hay .......................... E06B 3/24
52/202
9,057,218 B2 * 6/2015 Kennedy ................... E06B 5/12
11,286,711 B2 * 3/2022 Judson .................... E06B 5/106
2001/0005962 A1 * 7/2001 Emek .................... E06B 1/6046
52/204.5
2002/0166298 A1 * 11/2002 Emek ........................ E06B 5/12
52/208
2003/0044550 A1 * 3/2003 Emek .................... E06B 1/6046
428/34
2004/0025453 A1 * 2/2004 Coddens ................... E06B 5/12
52/202
2006/0112641 A1 * 6/2006 Salzer ....................... E06B 5/12
49/67
2008/0086960 A1 * 4/2008 Emek ........................ E06B 5/12
52/204.69
2010/0089229 A1 * 4/2010 Ackerman .............. F41H 5/013
89/36.04
2010/0186641 A1 * 7/2010 Hay, III .................... E06B 3/24
109/76
2011/0056365 A1 * 3/2011 Coddens ................... E06B 5/12
89/36.04
2011/0113706 A1 * 5/2011 Krause .................... F41H 5/263
52/204.5
2012/0085223 A1 * 4/2012 Kennedy ................... E06B 5/12
89/36.02
2012/0159881 A1 * 6/2012 White ....................... E06B 5/12
52/208
2012/0210862 A1 * 8/2012 Coddens ................... E06B 5/12
89/36.04
2015/0090411 A1 * 4/2015 Pyles .................... F41H 5/0407
160/368.1
2021/0095519 A1 * 4/2021 Judson .................. E06B 1/6061

* cited by examiner

HARDENED OPERABLE WINDOW SYSTEMS AND METHODS

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to protective structures and, more particularly but not exclusively, to hardened window, glazing, and/or door systems that can be used in new and existing buildings.

Description of the Related Art

This section introduces aspects that may help facilitate a better understanding of the invention. Accordingly, the statements of this section are to be read in this light and are not to be understood as admissions about what is prior art or what is not prior art.

Often, it is desirable to install hardened window, glazing, and/or door systems in a building or other structure. For example, when a building in a foreign country is converted to use as an embassy, it may be necessary to fortify the building with upgraded security features that include ballistic glazing (e.g. glass). Likewise, it may be desirable to have hardened windows with sliding features, so that the window can be opened and closed. Currently known compression frame systems and operable window systems have been used in governmental consulates and similar structures in various countries around the world.

Although currently available hardened window, glazing, and door systems, including compression frame systems and sliding window systems, provide valuable protection in many instances, still further improvements are desirable. Embodiments of the present invention provide solutions to at least some of these outstanding needs.

SUMMARY

The present invention was developed to address the challenges described in the Background section. Additional research and further development has led to a novel approach to provide improved hardened window, glazing, and/or door systems for installation into the walls of new and existing buildings.

Embodiments of the present invention encompass a variety of hardened window, glazing, and door systems that achieve specified requirements for ballistic, blast, and forced entry. Exemplary system embodiments use compression-type frames for simplified installation in new or existing facilities. In some instances, systems may include features which enhance the sliding capability and alignment of the glazing panels, for example during the fabrication process.

The window, glazing, and door systems disclosed herein can involve the use of compression frame features, whereby an exterior frame assembly and an interior frame assembly can be sandwiched around an opening (e.g. a rough opening) in a wall of a building or other structure, and the exterior frame assembly and an interior frame assembly can be compressed against the wall. Such compression can allow the window, glazing, and door systems to be securely fixed to the wall, without anchoring the window, glazing, and door systems into the wall itself, while at the same time providing desired blast, ballistic, and forced entry protection requirements.

The window, glazing, and door systems disclosed herein can be installed in any of a variety of buildings or and hardened structures. Typically, the window, glazing, and door systems are installed in a rough opening of such a building or structure. In exemplary embodiments, the window, glazing, and door systems are configured to meet desired blast and ballistic requirements. As described elsewhere herein, the window, glazing, and door systems can include frame assemblies which can be compressed around the opening in the wall of a building or structure (e.g. by torque tightening one or more bolts of the system). In some instances, a building or structure located at an embassy or a forward operating base may include a rough or low quality opening (e.g. where the opening is not plumb or square), and a window, glazing, or door system can be installed in the opening so as to achieve a desired blast, ballistic, and entry resistant standard. In this way, it is possible to use the window, glazing, and door systems disclosed herein to upgrade the security of existing buildings and other structures (e.g. retrofit). Likewise, it is possible to use the window, glazing, and door systems disclosed herein to upgrade the security of new buildings and other structures.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1:
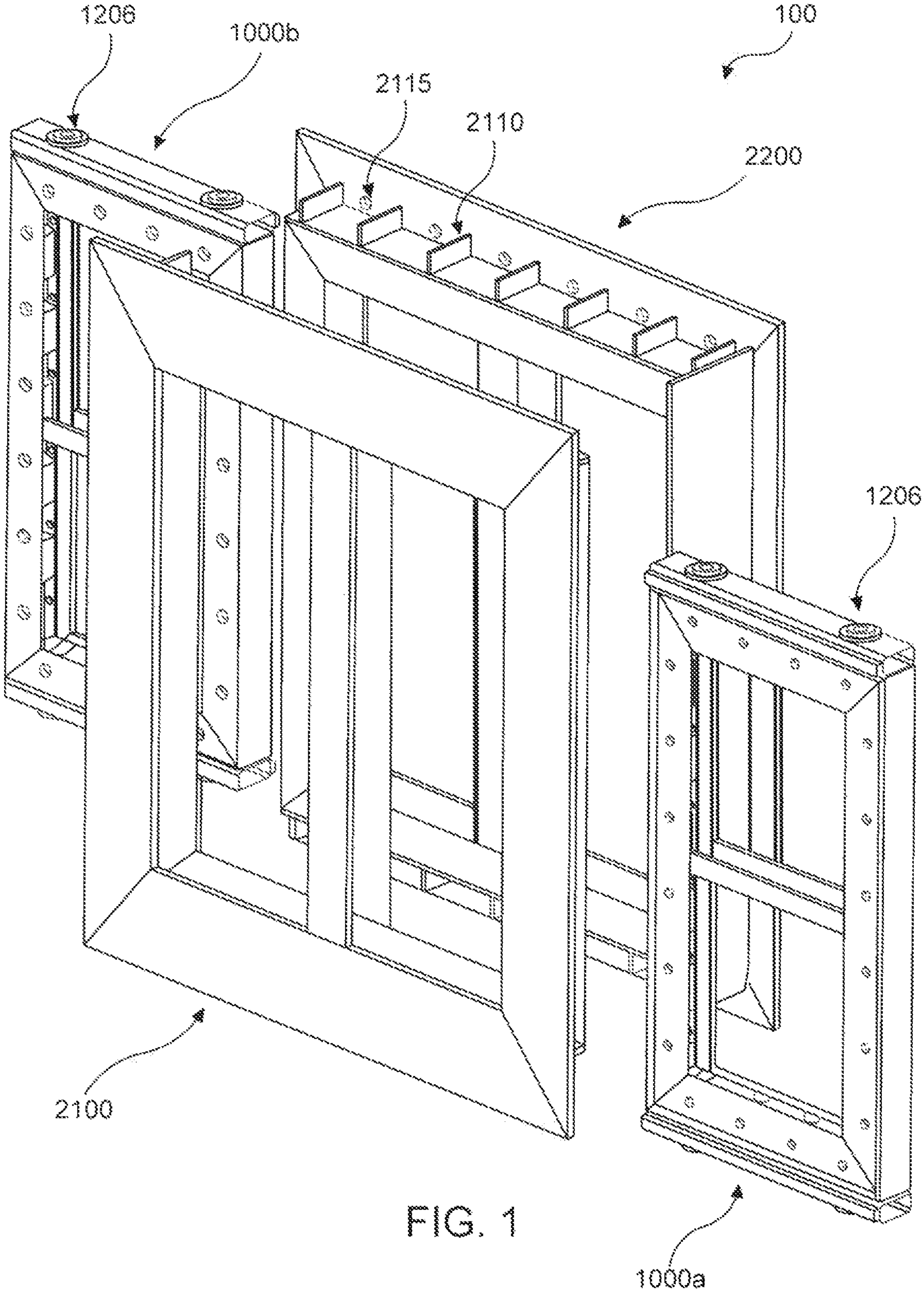
FIG. 1 depicts aspects of a Blast, Ballistic, And Entry Resistant Operable Window (BBROW) system, according to embodiments of the present invention.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The window, glazing, and door systems disclosed herein are well suited for use in buildings which may be present in any geographical location throughout the world. In some cases, the window, glazing, and door systems can be installed in buildings or structures which are located in hostile countries, or in countries where potentially hostile elements are present. In various examples, window, glazing, and/or door systems can be installed in an ambassador residence, a consulate building, or the like. In some cases, such buildings may be converted hotels or other structures that were originally constructed without incorporating any blast considerations. Hence, it is possible to modify an existing building by removing the existing windows and/or doors, and replacing those windows and/or doors with window, glazing, and/or door systems as disclosed herein. In some cases, exemplary window, glazing, and/or door systems can be installed in an existing opening of a building. In some cases, exemplary window, glazing, and/or door systems can be installed in a newly formed opening of a building.

The window, glazing, and door systems can be installed in buildings having a wide range of wall thicknesses. For example, the window, glazing, and door systems can be installed in buildings having a wall thickness of 10 inches. In some cases, the wall thickness may be 8 inches. In other cases, the wall thickness can be 24 inches. In some cases, the wall thickness can have a value within a range from 6 inches to 30 inches. In some cases, window, glazing, and door systems can include bolts of various lengths, which can be used to accommodate the various thicknesses provided by different wall configurations (e.g. longer bolts can be used when the wall is thicker, and shorter bolts can be used when the wall is thinner). The window, glazing, and door systems disclosed herein can also be provided in any of a variety of desired size dimensions. For example, a door system can be provided that complies with a 30/70 standard (30 inches by 70 inches), a 35/70 standard, and the like. During a blast, ballistic, and/or forced entry event, a force applied to the window, glazing, or door system can be distributed to the exterior outer perimeter of the system (e.g. to the peripheral flange of the exterior frame assembly) which contacts the building structure.

Turning now to the drawings, FIG. 1 depicts aspects of a Blast, Ballistic, And Entry Resistant Operable Window (BBROW) system 100 according to embodiments of the present invention. BBROW system 100 is shown in an unassembled exploded (perspective) view, and includes an exterior frame assembly 2100, an interior frame assembly 2200, a first (e.g. exterior) sliding glazing panel assembly 1000*a* and a second (e.g. interior) sliding glazing panel assembly 1000*b*. As illustrated here, the sliding glazing panel assemblies 1000*a*. 1000*b* include ball transfer units 1206. Interior frame assembly 2200 includes apertures 2115 and plates 2110.

Figure 2:
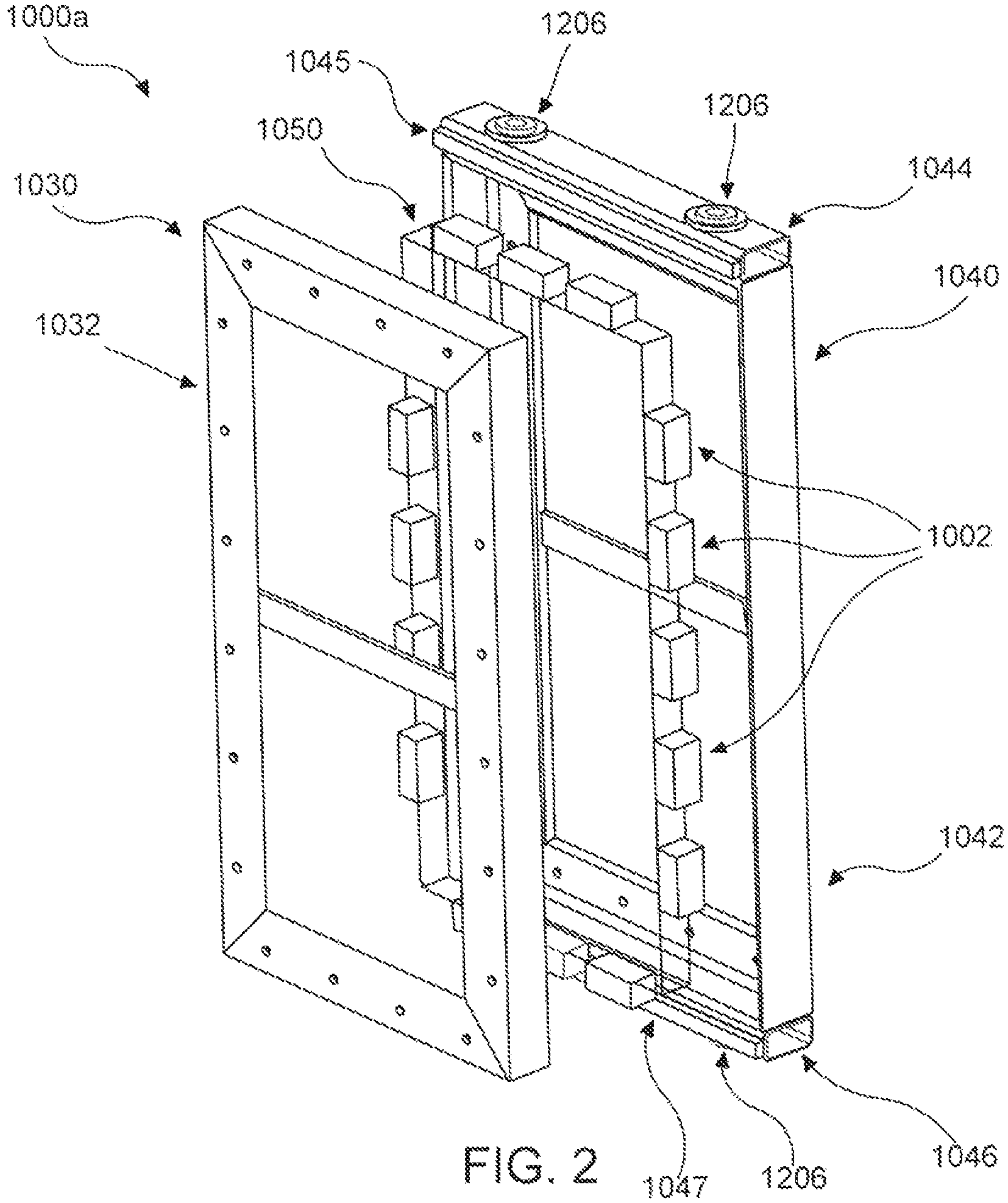
FIG. 2 depicts aspects of a sliding exterior glazing panel assembly, according to embodiments of the present invention.

FIG. 2 depicts aspects of a sliding exterior glazing panel assembly 1000*a* according to embodiments of the present invention. A sliding interior glazing panel assembly (not shown here) could have similar or equivalent features. Glazing panel assembly 1000*a* is shown in an unassembled exploded (perspective) view, and includes an exterior glazing frame 1030, an interior glazing frame 1040, a glazing panel (e.g. comprising ballistic glazing) 1050, and a plurality of settling blocks 1002. Interior glazing frame 1040 includes a rectangular glazing support 1042, an upper hollow structural section 1044, a lower hollow structural section 1046, an upper bar 1045 coupled with the upper hollow structural section 1044, a lower bar 1047 coupled with the lower hollow structural section 1046, and a plurality of ball transfer units 1206 coupled with the hollow structural section 1044, 1046. As explained elsewhere herein, in some cases, either or both bars 1045. 1047 may include a polytetrafluoroethylene (e.g. Teflon) pad coupled thereto. Exterior glazing frame 1030 includes a rectangular glazing support 1032. According to some embodiments, glazing panel 1050 includes ballistic glass. In some cases, glazing panel 1050 has a thickness of between 2 and 3 inches. In some case, glazing panel 1050 has a weight of 100 or 200 pounds.

Figure 3:
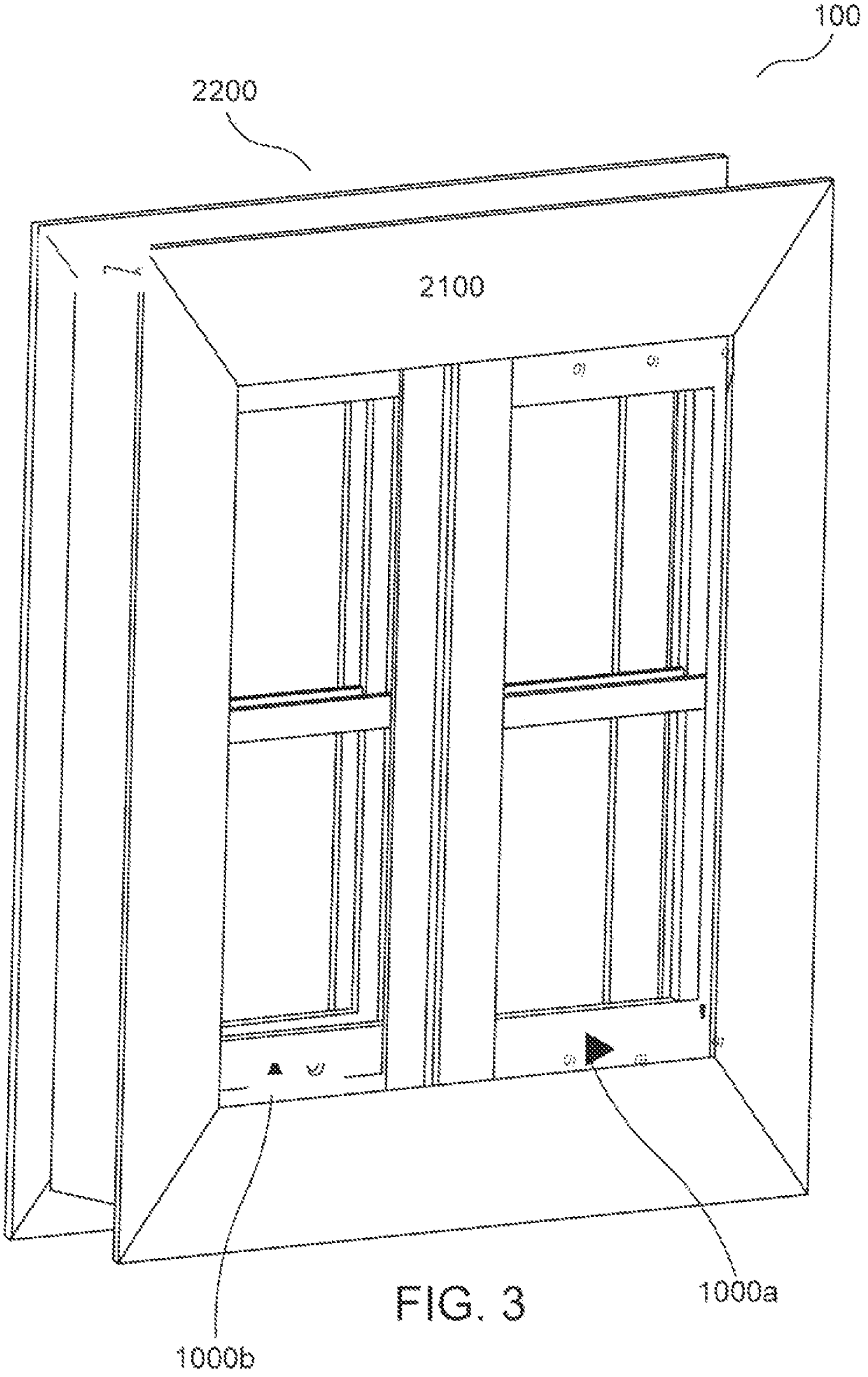
FIG. 3 depicts aspects of a Blast, Ballistic, And Entry Resistant Operable Window (BBROW) system, according to embodiments of the present invention.

FIG. 3 depicts aspects of a BBROW system 100 according to embodiments of the present invention. BBROW system 100 is shown in an assembled (perspective) view, and includes an exterior frame assembly 2100, an interior frame assembly 2200, a first (e.g. exterior) glazing panel assembly 1000*a* and a second (e.g. interior) glazing panel assembly 1000*b*.

Figure 4:
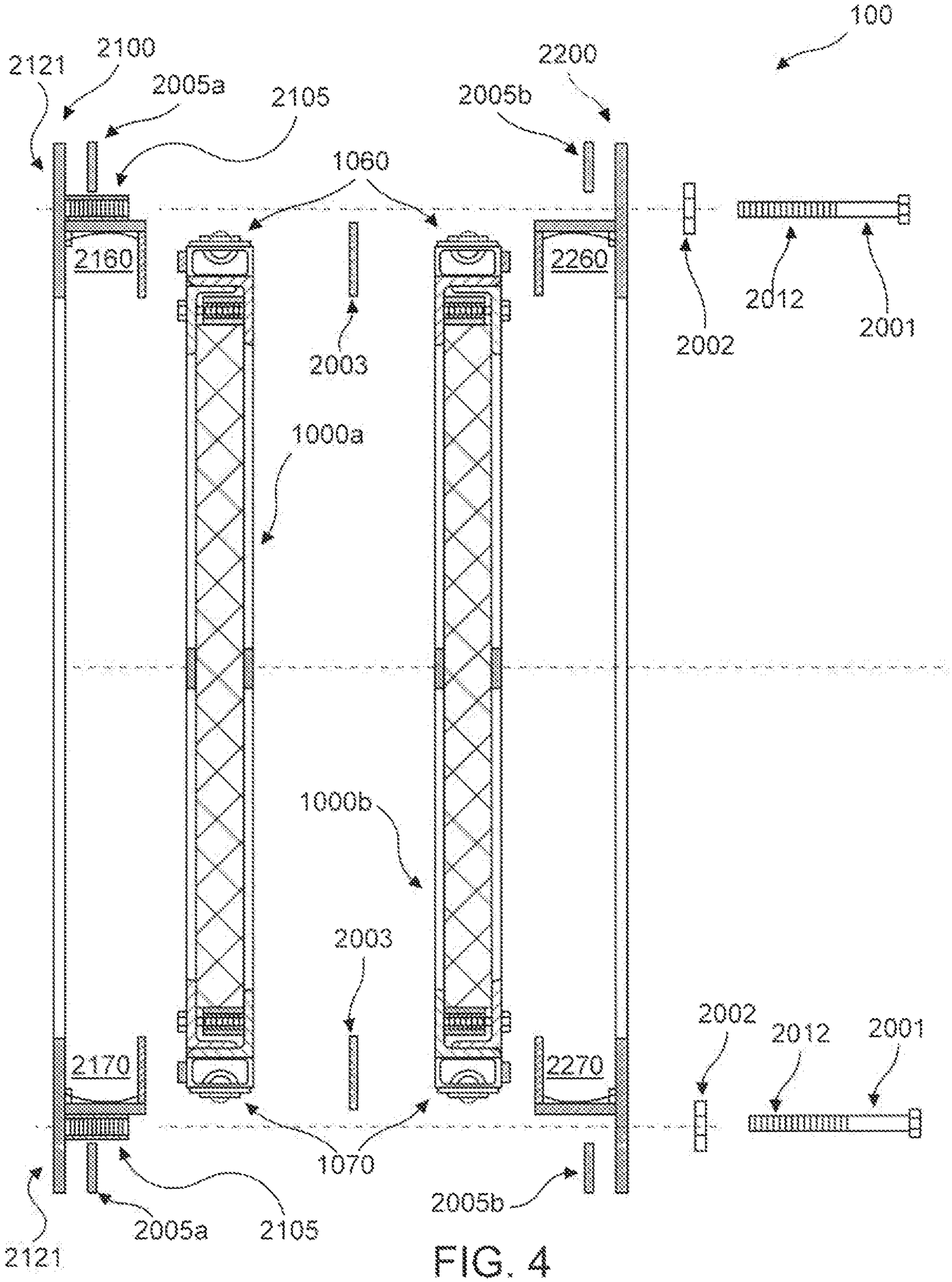
FIG. 4 depicts aspects of a Blast, Ballistic, And Entry Resistant Operable Window (BBROW) system, according to embodiments of the present invention.

FIG. 4 depicts aspects of a BBROW system 100 according to embodiments of the present invention. BBROW system 100 is shown in an unassembled exploded cross-section (side) view, and includes an exterior frame assembly 2100, an interior frame assembly 2200, a first (e.g. exterior) glazing panel assembly 1000*a* and a second (e.g. interior) glazing panel assembly 1000*b*. As illustrated here, an exterior frame assembly 2100 includes a plurality of threaded sleeves 2105 that are configured to receive threaded portions 2012 of respective threaded bolts 2001. Exterior frame assembly 2100 also includes an upper raceway 2160 configured to sliding receive or support an upper portion 1060 of the first glazing panel assembly 1000*a* and a lower raceway 2170 configured to sliding receive or support a lower upper portion 1070 of the first glazing panel assembly 1000*a*. Interior frame assembly 2200 includes apertures (not shown) that are adapted to receive threaded bolts 2001 therethrough. Upon assembly of BBROW system 100, bolts 2001 pass through washers 2002 and into sleeves 2105. Interior frame assembly 2200 also includes an upper raceway 2260 configured to sliding receive or support an upper portion 1060 of the second glazing panel assembly 1000*b* and a lower raceway 2270 configured to sliding receive or support a lower portion 1070 of the second glazing panel assembly 1000*b*, BBROW system 100 further includes an exterior gasket 2005*a*, a central gasket 2003, and an interior gasket 2005*b*.

Advantageously, due to the adjustability of the threaded bolts 2001 and/or the compressibility of the gaskets 2005*a* and/or 2005*b* (which can include a compressible material, such as rubber), the BBROW system 100 has a level of structural flexibility or tolerance which allows it to be installed in buildings where the wall thickness may not be entirely uniform. A peripheral flange 2121 of the exterior frame assembly 2100 can operate to prevent or inhibit the BBROW system 100 from being projected into the interior of the building in the event of an exterior blast. As another advantage, the gaskets can operate to provide friction between the system and the wall, so as to help hold the system in place relative to the wall (e.g. in the event of a blast, ballistic, and/or forced entry event).

Figure 5A:
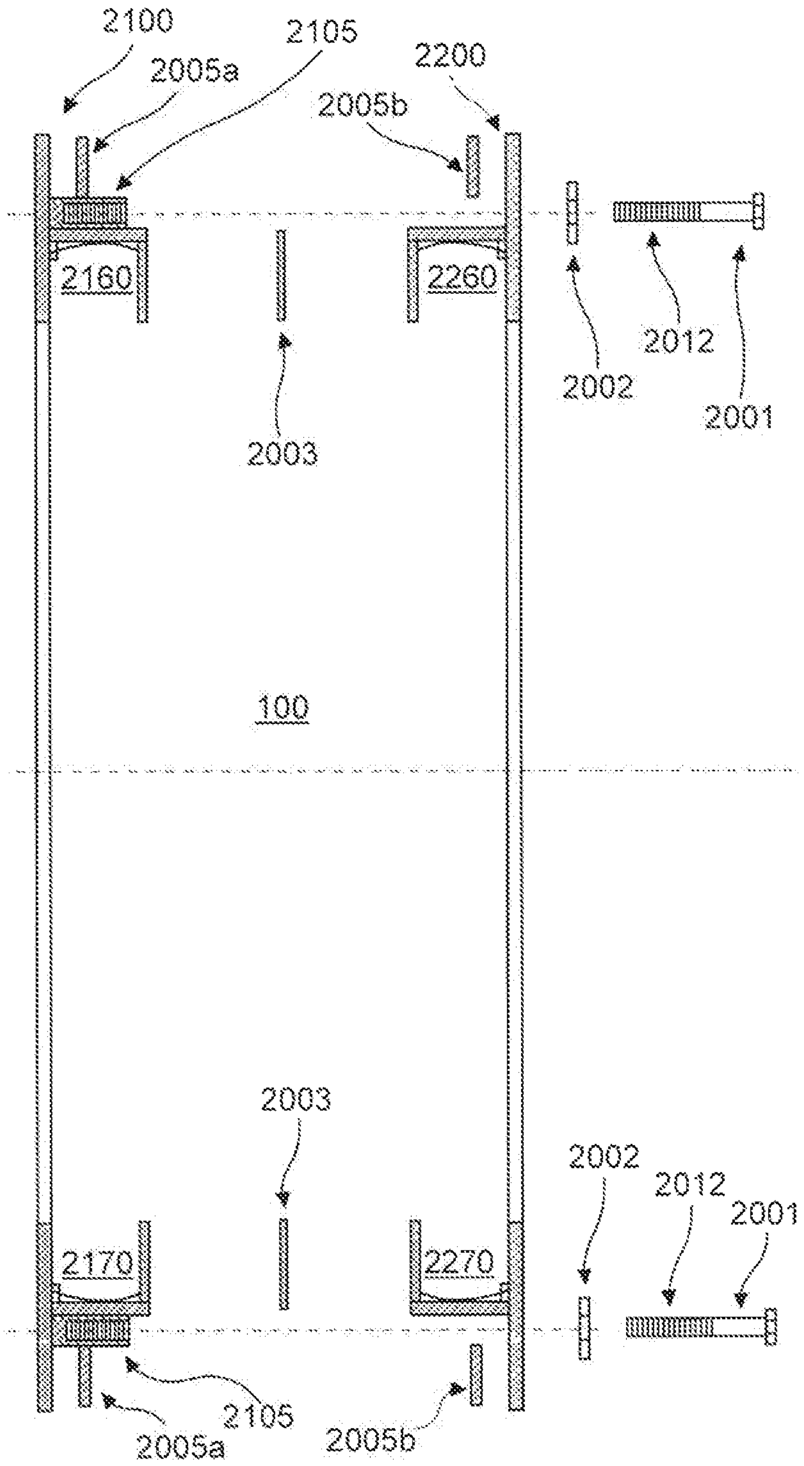
FIGS. 5A and 5B depict aspects of a Blast, Ballistic, And Entry Resistant Operable Window (BBROW) system, according to embodiments of the present invention.
Figure 5B:
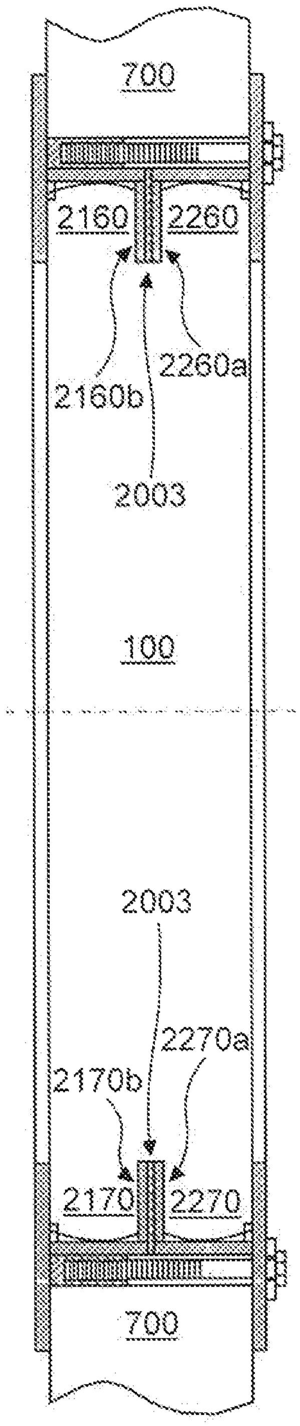

FIG. 5A provides an unassembled exploded cross-section (side) view of BBROW system 100 (without the glazing panel assemblies). BBROW system 100 includes an exterior frame assembly 2100 and an interior frame assembly 2200. As illustrated here, an exterior frame assembly 2100 includes a plurality of threaded sleeves 2105 that are configured to receive threaded portions 2012 of respective threaded bolts 2001. Exterior frame assembly 2100 also includes an upper raceway 2160 configured to sliding receive or support an upper portion of a first glazing panel assembly and a lower raceway 2170 configured to sliding receive or support a lower portion of a first glazing panel assembly. Interior frame assembly 2200 includes apertures (not shown) that are adapted to receive threaded bolts 2001 therethrough. Upon assembly of BBROW system 100 (as depicted in FIG. 5B), bolts 2001 pass through washers 2002 and into sleeves 2105. Interior frame assembly 2200 also includes an upper raceway 2260 configured to sliding receive or support an upper portion of a second glazing panel assembly and a lower raceway 2270 configured to sliding receive or support a lower portion of a second glazing panel assembly. BBROW system 100 further includes an exterior gasket 2005*a*, a central gasket 2003, and an interior gasket 2005*b*.

FIG. 5B provides an assembled cross-section (side) view of BBROW system 100 (without the glazing panel assemblies and exterior and interior gaskets). As shown here, central gasket 2003 is disposed between an interior portion 2160*b* of upper raceway 2160 and an exterior portion 2260*a* of upper raceway 2260, and between an interior portion 2170*b* of lower raceway 2170 and an exterior portion 2270*a* of lower raceway 2270. Relatedly, FIG. 7B depicts an example where a BBROW system 100 is assembled and installed in the wall of a building.

Advantageously, due to the placement and orientation of the threaded sleeves 21050, it is possible to secure the system 100 to the building without having any bolts and/or nuts exposed on the exterior of the wall 700. By torqueing the bolts 2001 down into the sleeves 2105, it is possible to produce compression forces against the wall 700 between the exterior frame assembly 2100 and the interior frame assembly 2200.

Figure 6:
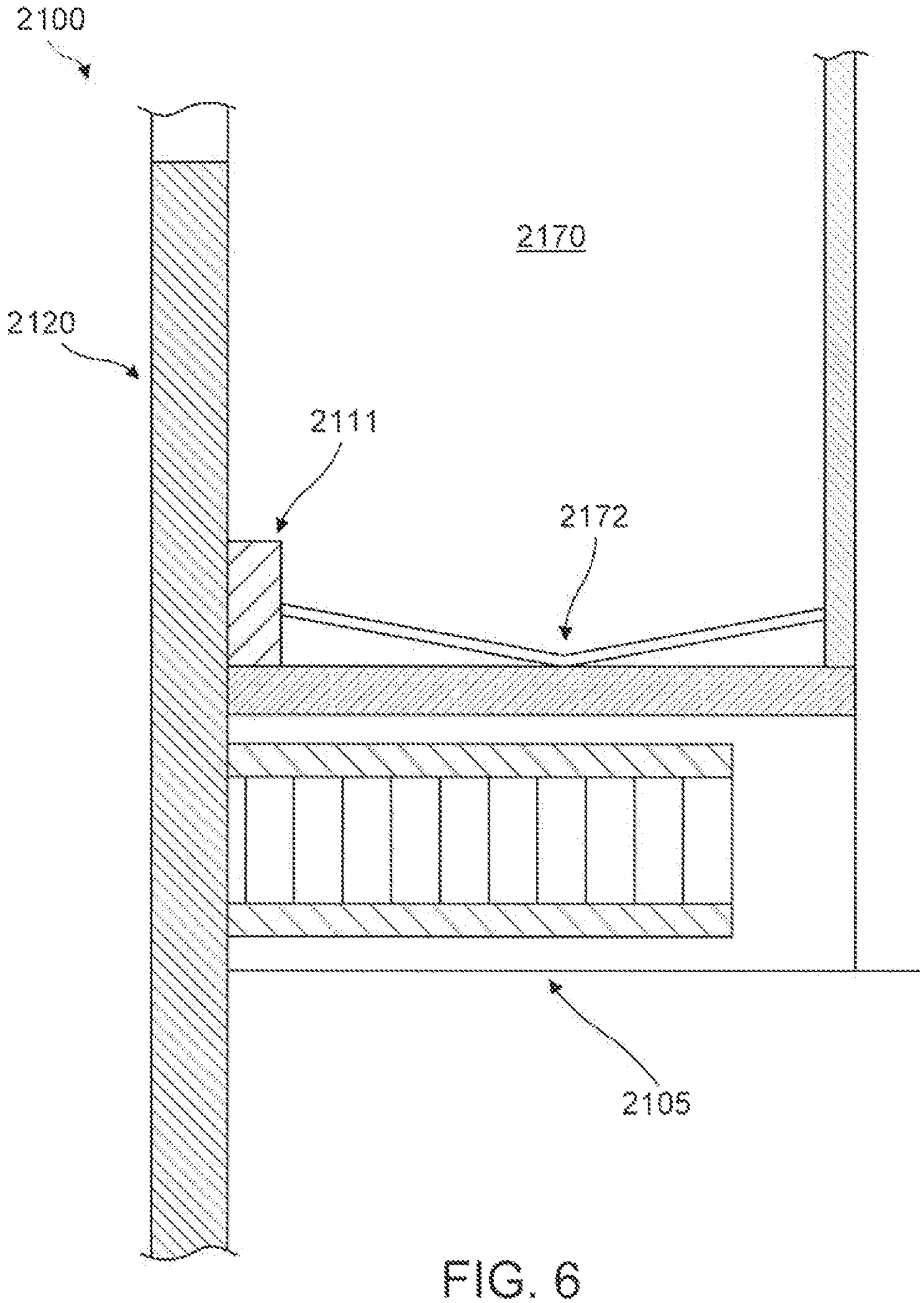
FIG. 6 illustrates aspects of an exterior frame assembly, according to embodiments of the present invention.

FIG. 6 provides a close-up cross-section (side) view of a lower portion 2120 of an exterior frame assembly 2100. As shown here, the lower portion 2120 includes a lower raceway 2170 and a threaded sleeve 2105. The lower raceway 2170 includes a lower raceway track 2172 and a spacer 2111. The spacer 2111 operates to offset the raceway track 2172 so as to align with the glazing panel assembly (not shown) and the ball transfer unit (not shown).

Figure 7A:
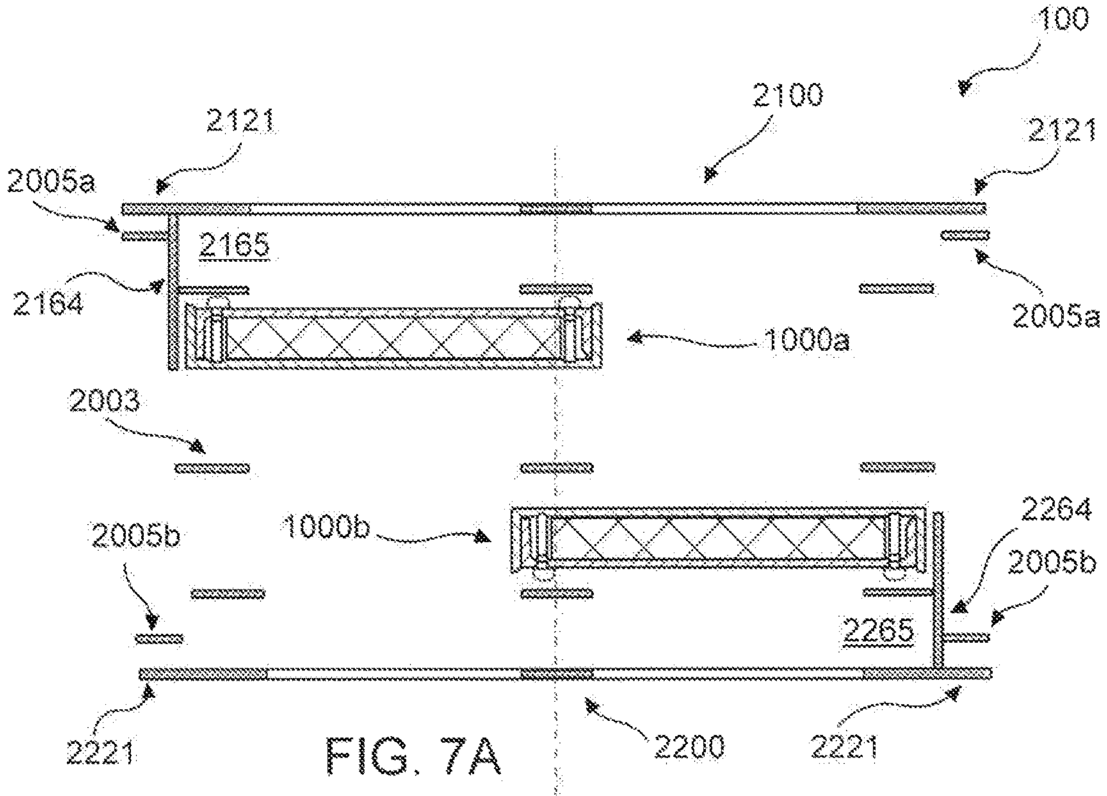
FIGS. 7A and 7B depict aspects of a Blast, Ballistic, And Entry Resistant Operable Window (BBROW) system, according to embodiments of the present invention.
Figure 7B:
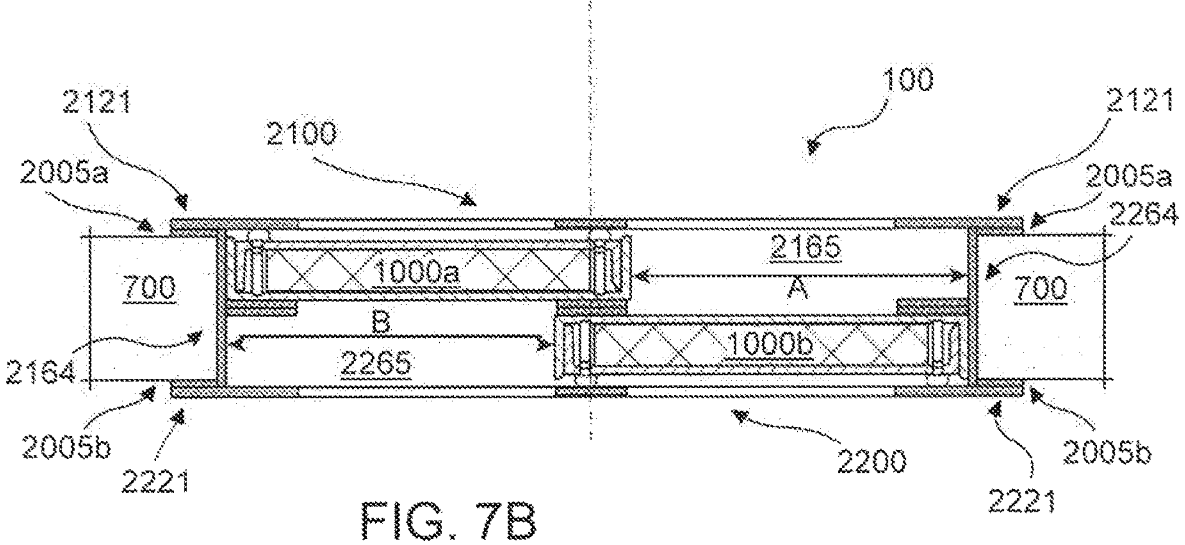

FIG. 7A provides an unassembled exploded cross-section (top) view of BBROW system 100. BBROW system 100 includes an exterior frame assembly 2100, an interior frame assembly 2200, a first (e.g. exterior) glazing panel assembly 1000*a*, a second (e.g. interior) glazing panel assembly 1000*b*, an exterior gasket 2005*a*, a central gasket 2003, and an interior gasket 2005*b*. Exterior frame assembly 2100 includes a peripheral flange 2121, and a guide 2165 configured to sliding receive or support the first glazing panel assembly 1000*a*. Interior frame assembly 2200 includes a peripheral flange 2221, and a guide 2265 configured to sliding receive or support the second glazing panel assembly 1000*b*. Hence, when BBROW system 100 is assembled, for example as depicted in FIG. 7B, exterior gasket 2005*a* is positioned between peripheral flange 2121 and wall 700, interior gasket 2005*b* is positioned between peripheral flange 2221 and wall 700, glazing panel assembly 1000*a* can move (e.g. slide) relative to the exterior frame assembly 2100 as depicted by arrow A, and glazing panel assembly 1000*b* can move (e.g. slide) relative to the interior frame assembly 2200 as depicted by arrow B. As shown in FIG. 7A, exterior frame assembly 2100 includes an exterior stop 2164 and interior frame assembly 2200 includes an interior stop 2264. Hence, when BBROW system 100 is assembled, for example as depicted in FIG. 7B, guide 2165 is bounded by exterior stop 2164 and interior stop 2264, and guide 2265 is bounded by exterior stop 2164 and interior stop 2264. FIG. 7B provides an assembled cross-section (top) view of BBROW system 100, as installed in an opening of a wall 700.

Figure 8:
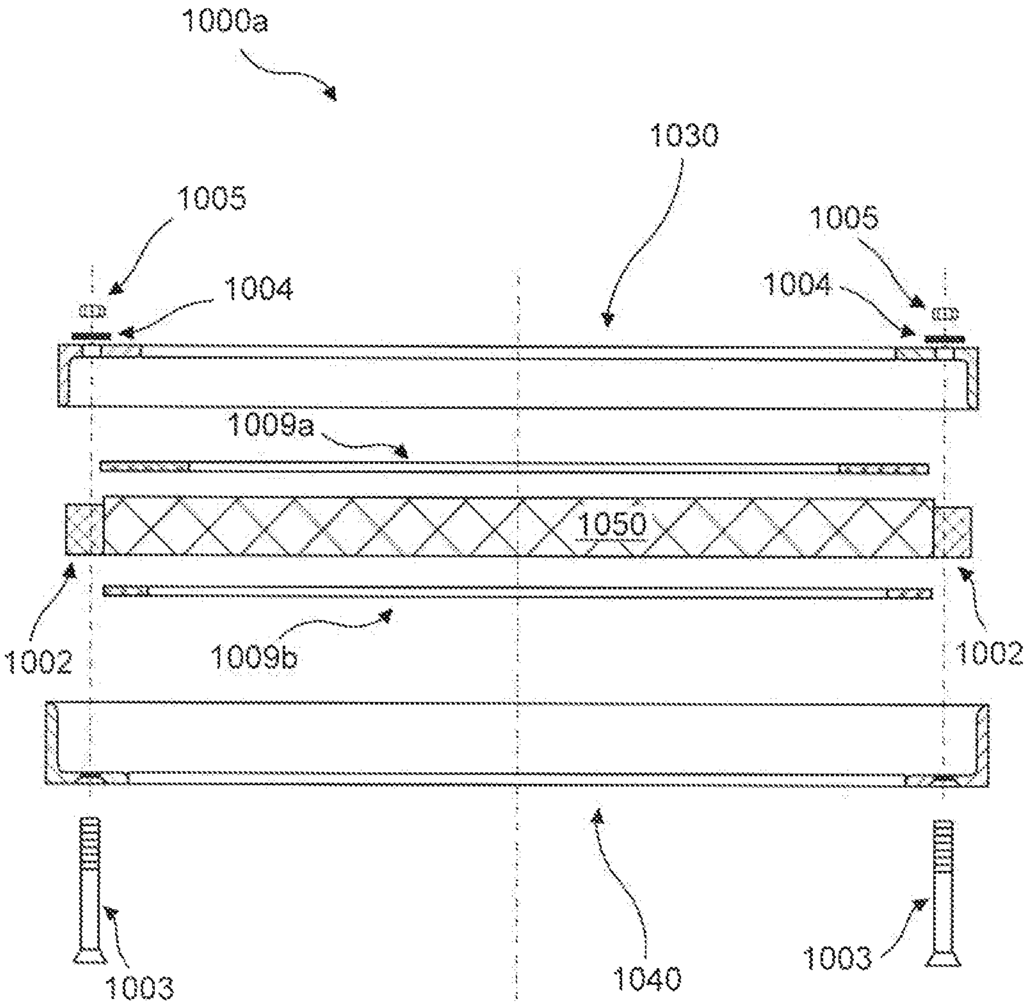
FIG. 8 depicts aspects of an exterior glazing panel assembly, according to embodiments of the present invention.
Figure 9:
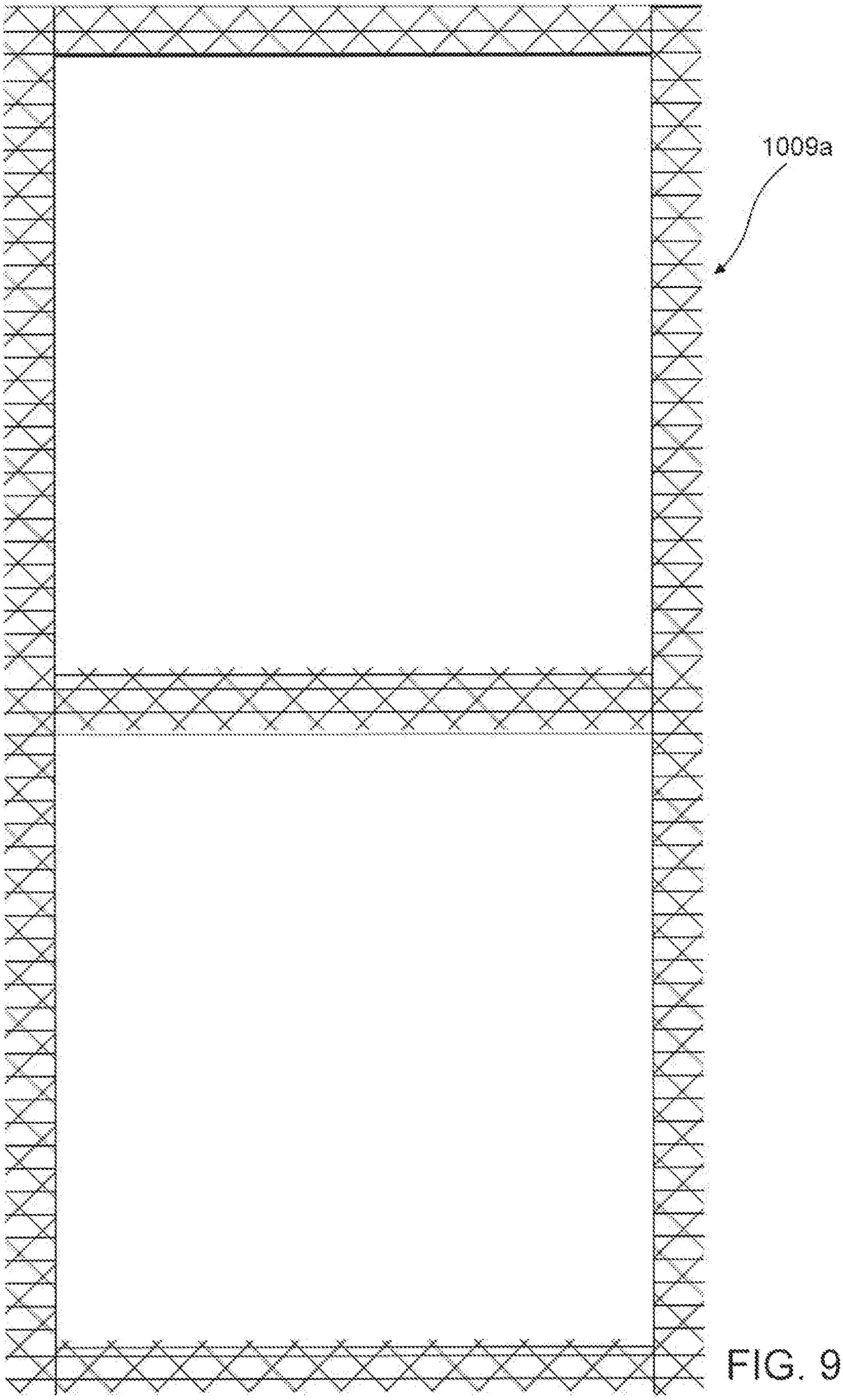
FIG. 9 depicts aspects of an exterior glazing gasket, according to embodiments of the present invention.

FIG. 8 depicts aspects of an exterior glazing panel assembly 1000*a* according to embodiments of the present invention. An interior glazing panel assembly (not shown here)

could have similar or equivalent features. Glazing panel assembly 1000*a* is shown in an unassembled exploded (top) view, and includes an exterior glazing frame 1030, an interior glazing frame 1040, a glazing panel (e.g. comprising ballistic glazing) 1050, an exterior glazing gasket 1009*a*, an interior glazing gasket 1009*b*, a plurality of threaded bolts 1003, a plurality of washers 1004, and a plurality of hex nuts 1005. When the glazing panel assembly is assembled, exterior gasket 1009*a* can be positioned between exterior glazing frame 1030 and glazing panel 1050, and interior gasket 1009*b* can be positioned between interior glazing frame 1040 and glazing panel 1050. FIG. 9 depicts aspects of an exterior glazing gasket 1009*a* according to embodiments of the present invention. Exterior glazing gasket 1009*a* is shown in a front (or elevation) view. An interior glazing gasket (not shown here) could have similar or equivalent features. The glazing gasket has a configuration similar to that of the glazing support depicted in FIG. 2.

Figure 10:
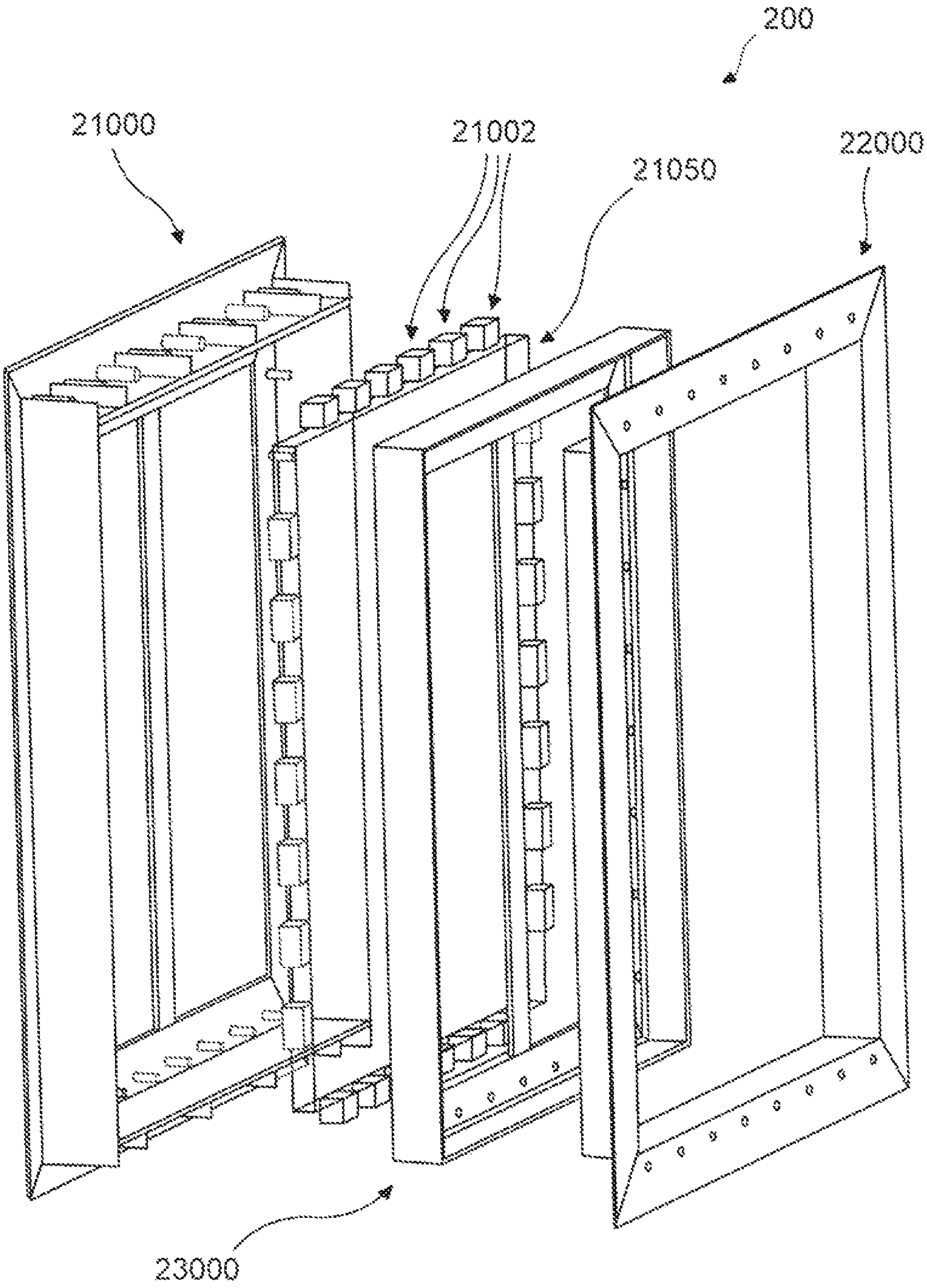
FIG. 10 depicts aspects of a Blast, Ballistic, And Entry Resistant Glazing (BBERG) system, according to embodiments of the present invention.

FIG. 10 depicts aspects of a Blast, Ballistic, And Entry Resistant Glazing (BBERG) system 200 according to embodiments of the present invention. BBERG system 200 is shown in an unassembled exploded (perspective) view, and includes an exterior frame assembly 21000, an interior frame assembly 22000, a middle frame assembly 23000, a glazing pane 21050 (e.g. comprising ballistic glazing), and a plurality of settling blocks 21002. Advantageously, the settling blocks 21002, which may be constructed of or include a compressible material (e.g. rubber) can help to position the glazing pane 21050 within or relative to the middle frame assembly 23000, and can help to prevent the glazing pane 21050 from directly contacting the middle frame assembly 23000 (which may be constructed of or include a hard material, such as metal or steel). In this way, the blocks 21002 can operate to prevent the glazing pane 21050 from cracking or breaking when forces are applied to the system 200.

Figure 11A:
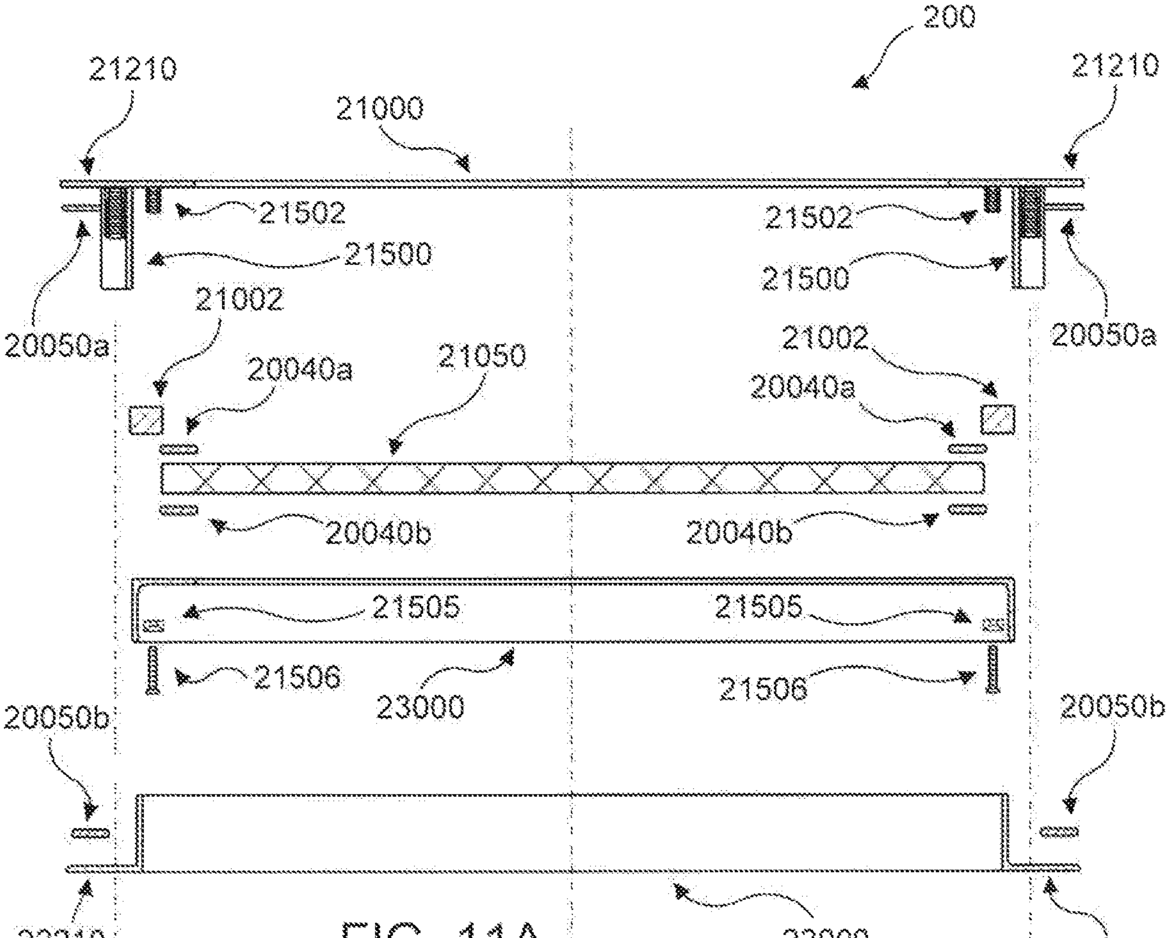
FIGS. 11A and 11B depict aspects of a Blast, Ballistic, And Entry Resistant Glazing (BBERG) system, according to embodiments of the present invention.

FIG. 11A provides an unassembled exploded cross-section (side) view of BBERG system 200. BBERG system 200 includes an exterior frame assembly 21000, an interior frame assembly 22000, a middle frame assembly 23000, a glazing pane 21050 (e.g. comprising ballistic glazing), and a plurality of settling blocks 21002. As illustrated here, an exterior frame assembly 21000 includes a plurality of threaded sleeves 21500 that are configured to receive threaded portions 20120 of respective threaded bolts 20010. Interior frame assembly 22000 includes apertures (not shown) that are adapted to receive threaded bolts 20010 therethrough. Upon assembly of BBERG system 200 (as depicted in FIG. 11B), bolts 20010 pass through washers 20020, through apertures (not shown) in interior frame assembly 22000, and into sleeves 21500.

As depicted in FIG. 11A, BBERG system 200 further includes an exterior gasket 20050*a*, an exterior glazing gasket 20040*a*, an interior glazing gasket 20040*b*, and an interior gasket 20050*b*. Exterior frame assembly 21000 also includes a plurality of threaded intermediate sleeves 21502 that are configured to receive threaded portions of respective threaded bolts 21506. Upon assembly of BBERG system 200 (as depicted in FIG. 11B), bolts 21506 pass through washers 21505, through apertures (not shown) in middle frame assembly 23000, and into intermediate sleeves 21502.

Figure 11B:
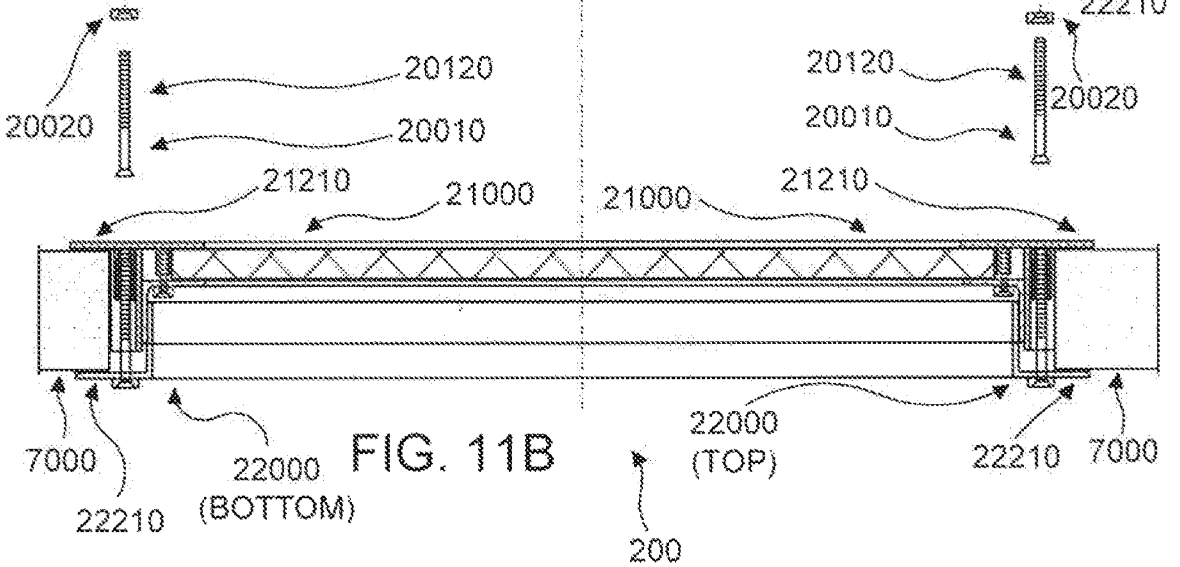

FIG. 11B provides an assembled cross-section (side) view of BBERG system 200. Exterior frame assembly 21000 includes a peripheral flange 21210, and interior frame assembly 22000 includes a peripheral flange 22210. Hence, when BBERG system 200 is assembled, for example as depicted in FIG. 11B, exterior gasket 20050*a* is positioned between peripheral flange 21210 and wall 7000, and interior gasket 20050*b* is positioned between peripheral flange 22210 and wall 7000. FIG. 11B depicts an example where a BBERG system 200 is assembled and installed in the wall 7000 of a building.

Advantageously, due to the adjustability of the threaded bolts 20010 and/or the compressibility of the gaskets 20050*a* and/or 20050*b* (which can include a compressible material, such as rubber), the BBERG system 200 has a level of structural flexibility or tolerance which allows it to be installed in buildings where the wall thickness may not be entirely uniform. A peripheral flange 21210 of the exterior frame assembly 21000 can operate to prevent or inhibit the BBERG system 200 from being projected into the interior of the building in the event of an exterior blast. As another advantage, the gaskets can operate to provide friction between the system and the wall, so as to help hold the system in place relative to the wall (e.g. in the event of a blast, ballistic, and/or forced entry event).

Further advantageously, due to the placement and orientation of the threaded sleeves 21500, it is possible to secure the system 200 to the building without having any bolts and/or nuts exposed on the exterior of the wall 7000.

Figure 12A:
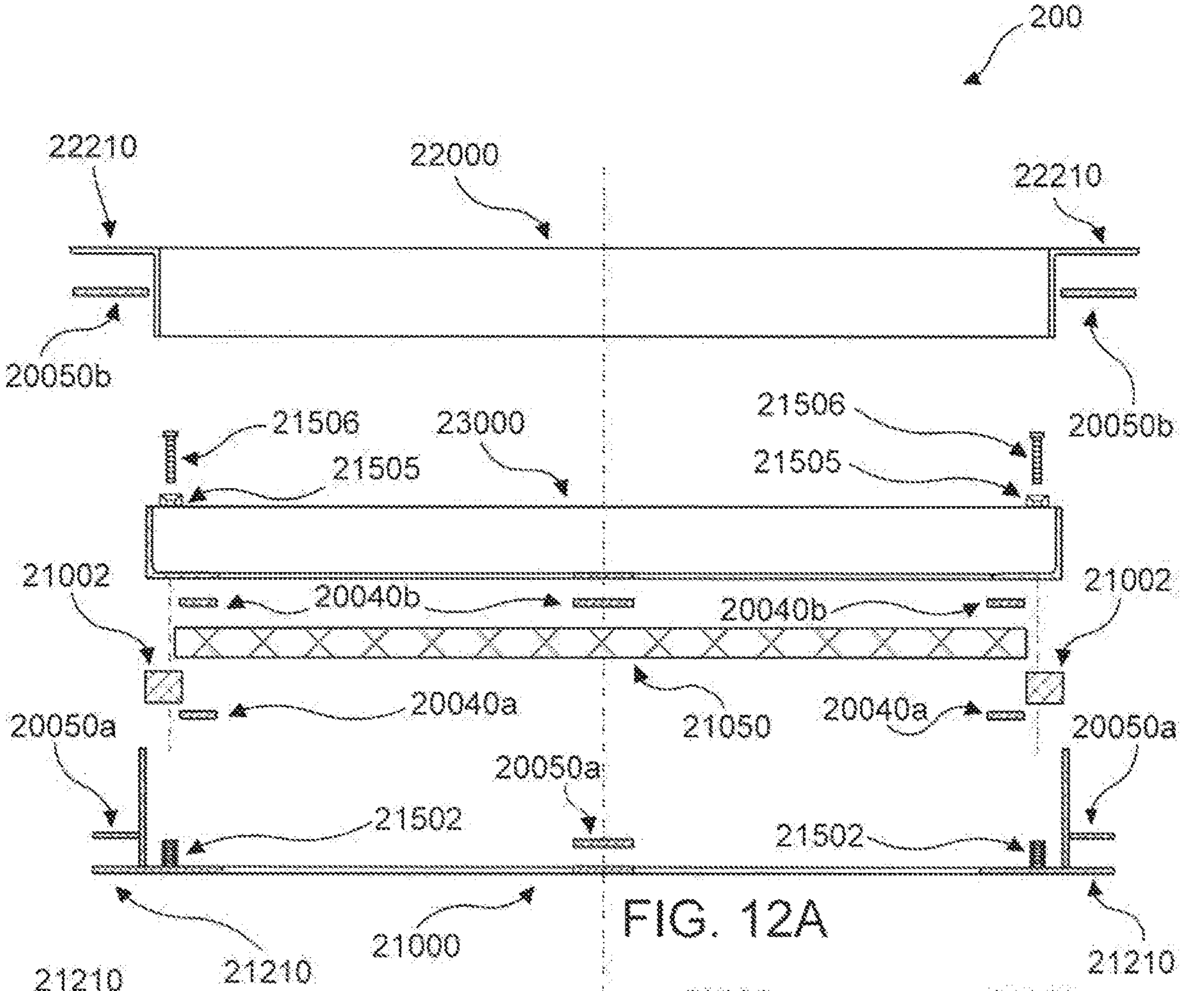
FIGS. 12A and 12B depict aspects of a Blast, Ballistic, And Entry Resistant Glazing (BBERG) system, according to embodiments of the present invention.

FIG. 12A depicts aspects of a Blast, Ballistic, And Entry Resistant Glazing (BBERG) system 200 according to embodiments of the present invention. BBERG system 200 is shown in an unassembled exploded (top) view, and includes an exterior frame assembly 21000, an interior frame assembly 22000, a middle frame assembly 23000, a glazing pane 21050 (e.g. comprising ballistic glazing), and a plurality of settling blocks 21002.

FIG. 12A provides an unassembled exploded cross-section (top) view of BBERG system 200. BBERG system 200 includes an exterior frame assembly 21000, an interior frame assembly 22000, a middle frame assembly 23000, a glazing pane 21050 (e.g. comprising ballistic glazing), and a plurality of settling blocks 21002. BBERG system 200 further includes an exterior gasket 20050*a*, an exterior glazing gasket 20040*a*, an interior glazing gasket 20040*b*, and an interior gasket 20050*b*. Exterior frame assembly 21000 also includes a plurality of threaded intermediate sleeves 21502 that are configured to receive threaded portions of respective threaded bolts 21506. Upon assembly of BBERG system 200 (as depicted in FIG. 12B), bolts 21506 pass through washers 21505, through apertures (not shown) in middle frame assembly 23000, and into intermediate sleeves 21502.

Figure 12B:
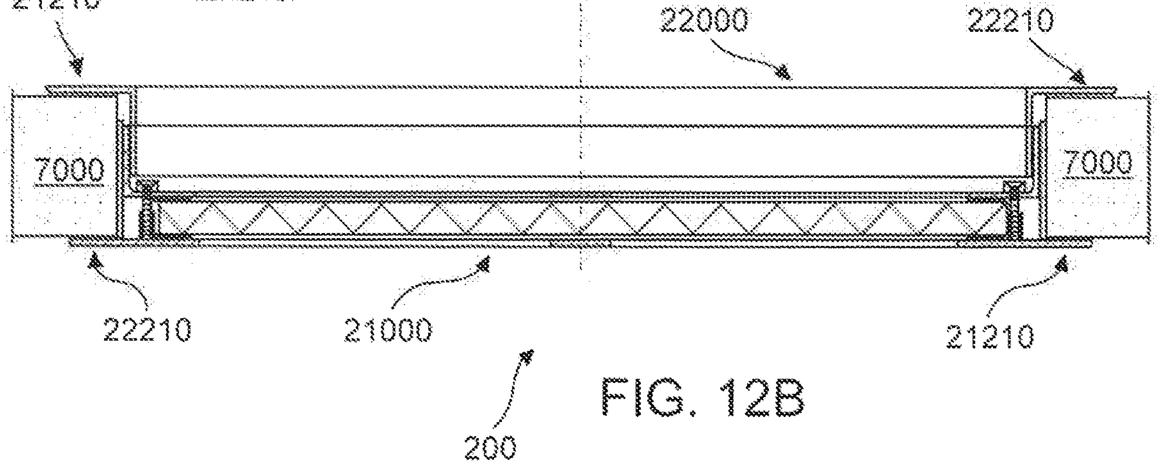

FIG. 12B provides an assembled cross-section (top) view of BBERG system 200. Exterior frame assembly 21000 includes a peripheral flange 21210, and interior frame assembly 22000 includes a peripheral flange 22210. Hence, when BBERG system 200 is assembled, for example as depicted in FIG. 12B, exterior gasket 20050*a* is positioned between peripheral flange 21210 and wall 7000, and interior gasket 20050*b* is positioned between peripheral flange 22210 and wall 7000. FIG. 12B depicts an example where a BBERG system 200 is assembled and installed in the wall 7000 of a building.

Figure 13:
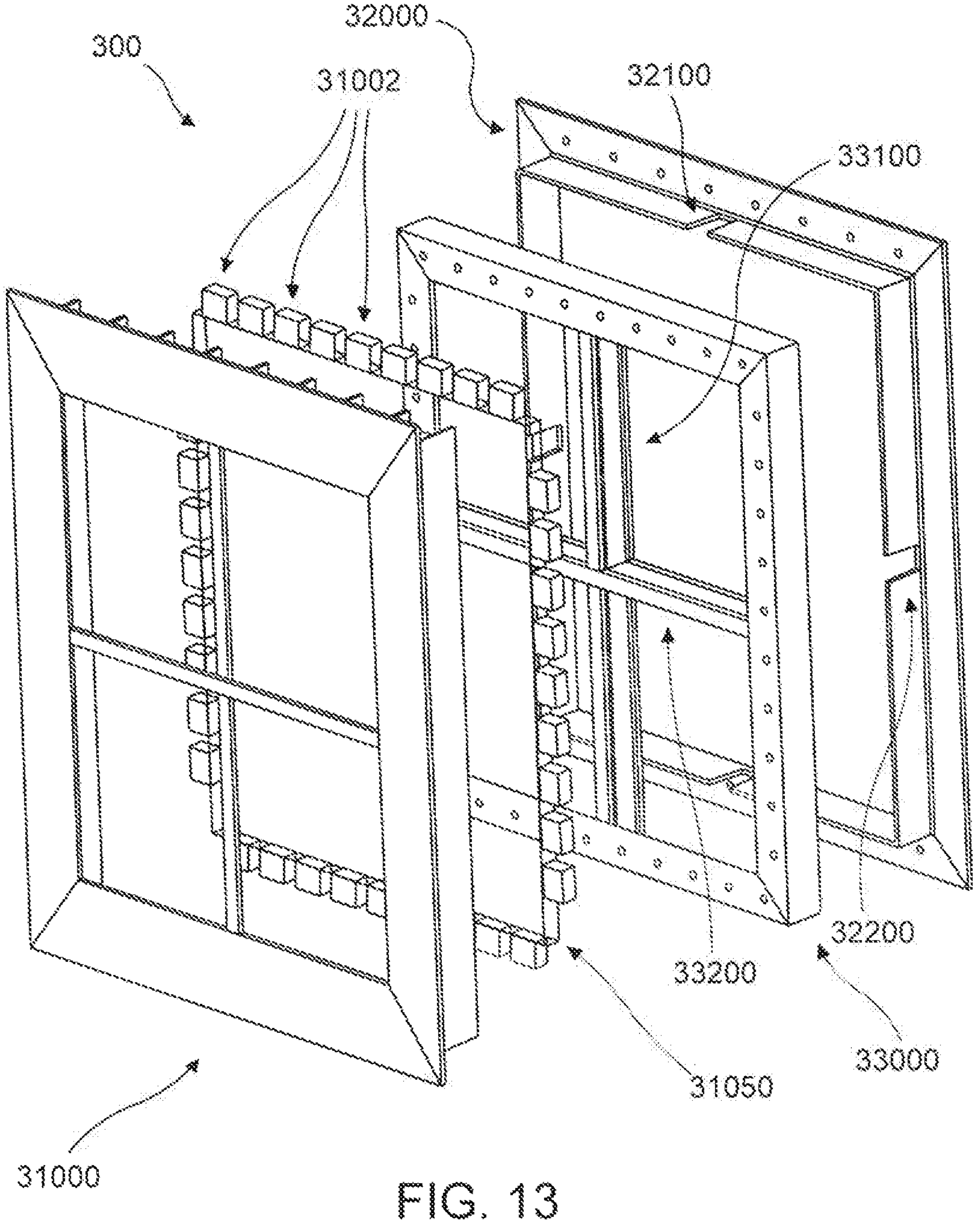
FIG. 13 depicts aspects of a Blast, Ballistic, And Entry Resistant Glazing-Heavy (BBERG-H) system, according to embodiments of the present invention.

FIG. 13 depicts aspects of a Blast, Ballistic, And Entry Resistant Glazing-Heavy (BBERG-H) system 300 according to embodiments of the present invention. BBERG-H system 300 is shown in an unassembled exploded (perspective) view, and includes an exterior frame assembly 31000, an interior frame assembly 32000, a middle frame assembly 33000, a glazing pane 31050 (e.g. comprising ballistic glazing), and a plurality of settling blocks 31002. Middle frame assembly 33000 includes a vertical hollow structural section 33100 and a horizontal hollow structural section 33200. Interior frame assembly 32000 includes vertical grooves 32100 that are configured to receive vertical hollow structural section 33100 of middle frame assembly 33000, and horizontal grooves 32200 that are configured to receive horizontal hollow structural section 33200 of middle frame assembly 33000. According to some embodiments, the presence of the vertical and/or horizontal hollow structural sections allow BBERG-H system 300 to withstand greater blast forces (e.g. as compared with BBERG system 200).

Figure 14A:
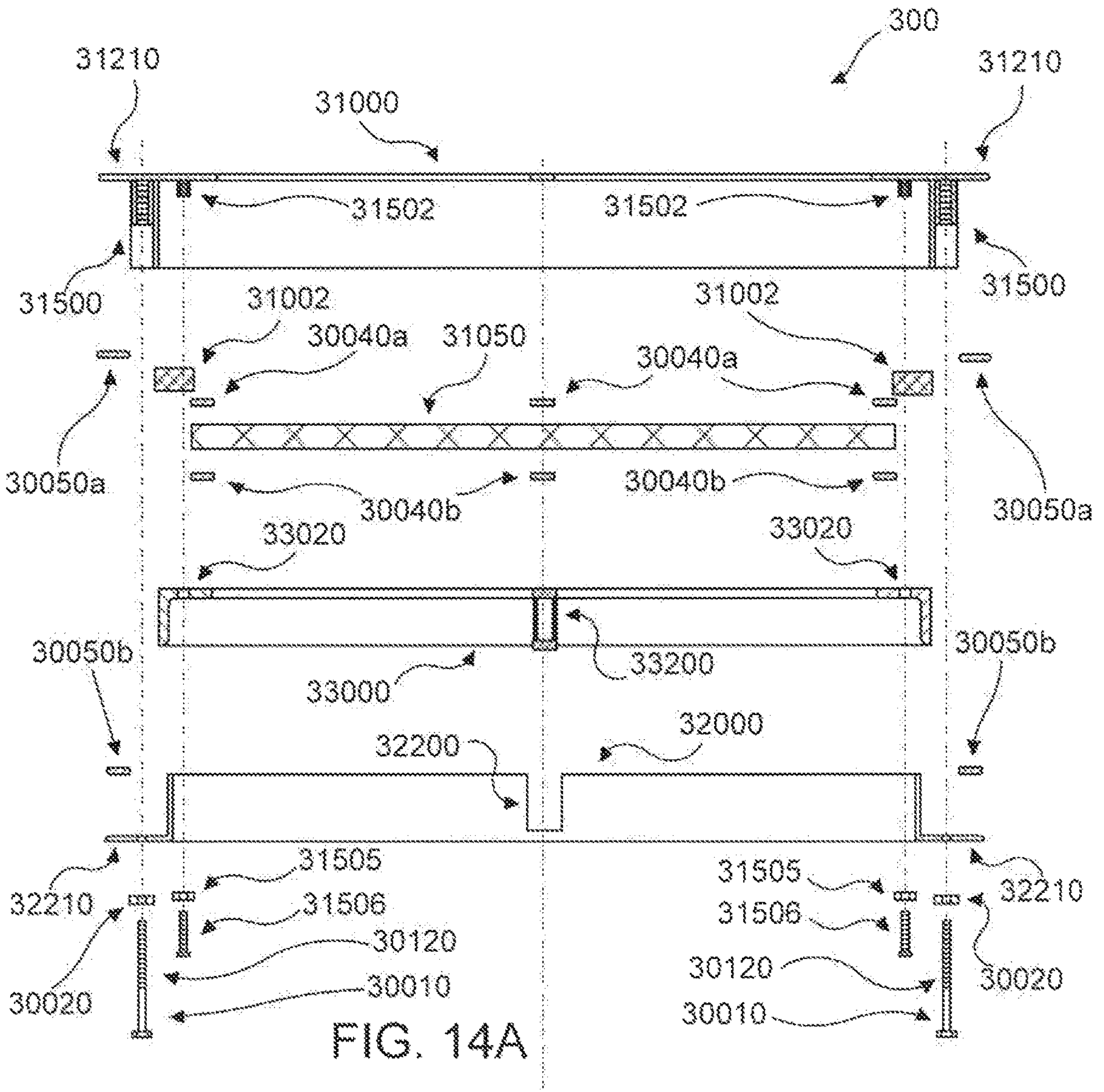
FIGS. 14A and 14B depict aspects of a Blast, Ballistic, And Entry Resistant Glazing-Heavy (BBERG-H) system, according to embodiments of the present invention.

FIG. 14A provides an unassembled exploded cross-section (side) view of BBERG-H system 300. BBERG-H system 300 includes an exterior frame assembly 31000, an interior frame assembly 32000, a middle frame assembly 33000, a glazing pane 31050 (e.g. comprising ballistic glazing), and a plurality of settling blocks 31002. As illustrated here, an exterior frame assembly 31000 includes a plurality of threaded sleeves 31500 that are configured to receive threaded portions 30120 of respective threaded bolts 30010. Interior frame assembly 32000 includes apertures (not shown) that are adapted to receive threaded bolts 30010 therethrough. Upon assembly of BBERG-H system 300 (as depicted in FIG. 14B), bolts 30010 pass through washers 30020, through apertures (not shown) in interior frame assembly 32000, and into sleeves 31500.

As depicted in FIG. 14A, BBERG-H system 300 further includes an exterior gasket 30050*a*, an exterior glazing gasket 30040*a*, an interior glazing gasket 30040*b*, and an interior gasket 30050*b*. Exterior frame assembly 31000 also includes a plurality of threaded intermediate sleeves 31502 that are configured to receive threaded portions of respective threaded bolts 31506. Upon assembly of BBERG-H system 300 (as depicted in FIG. 14B), bolts 31506 pass through washers 31505, through apertures 33020 in middle frame assembly 33000, and into intermediate sleeves 31502. Interior frame assembly 32000 includes horizontal grooves 32200 that are configured to receive horizontal hollow structural section 33200 of middle frame assembly 33000.

Figure 14B:
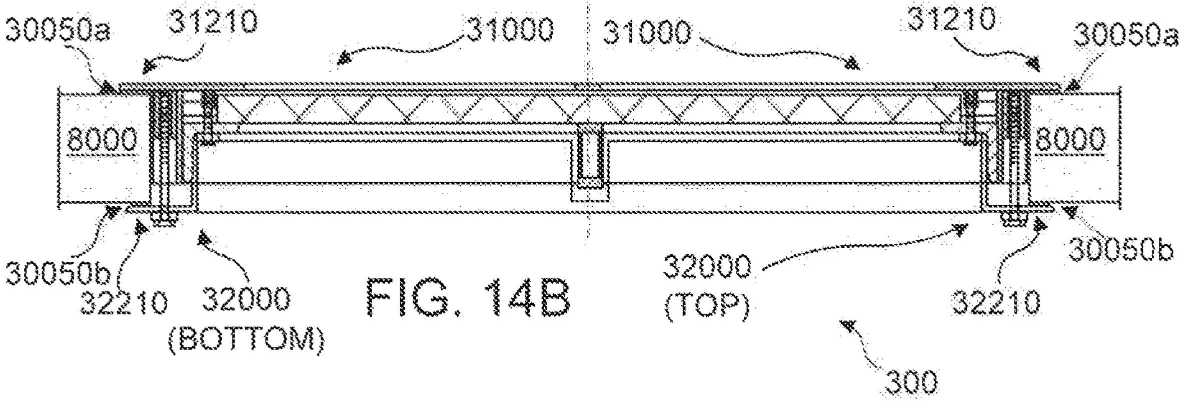

FIG. 14B provides an assembled cross-section (side) view of BBERG-H system 300. Exterior frame assembly 31000 includes a peripheral flange 31210, and interior frame assembly 32000 includes a peripheral flange 32210. Hence, when BBERG-H system 300 is assembled, for example as depicted in FIG. 14B, exterior gasket 30050*a* is positioned between peripheral flange 31210 and wall 8000, and interior gasket 30050*b* is positioned between peripheral flange 32210 and wall 7000. FIG. 14B depicts an example where a BBERG-H system 300 is assembled and installed in the wall 8000 of a building.

Advantageously, due to the adjustability of the threaded bolts 30010 and/or the compressibility of the gaskets 30050*a* and/or 30050*b* (which can include a compressible material, such as rubber), the BBERG-H system 300 has a level of structural flexibility or tolerance which allows it to be installed in buildings where the wall thickness may not be entirely uniform. A peripheral flange 31210 of the exterior frame assembly 31000 can operate to prevent or inhibit the BBERG-H system 300 from being projected into the interior of the building in the event of an exterior blast. As another advantage, the gaskets can operate to provide friction between the system and the wall, so as to help hold the system in place relative to the wall (e.g. in the event of a blast, ballistic, and/or forced entry event).

Further advantageously, due to the placement and orientation of the threaded sleeves 31500, it is possible to secure the system 300 to the building without having any bolts and/or nuts exposed on the exterior of the wall 8000.

Figure 15A:
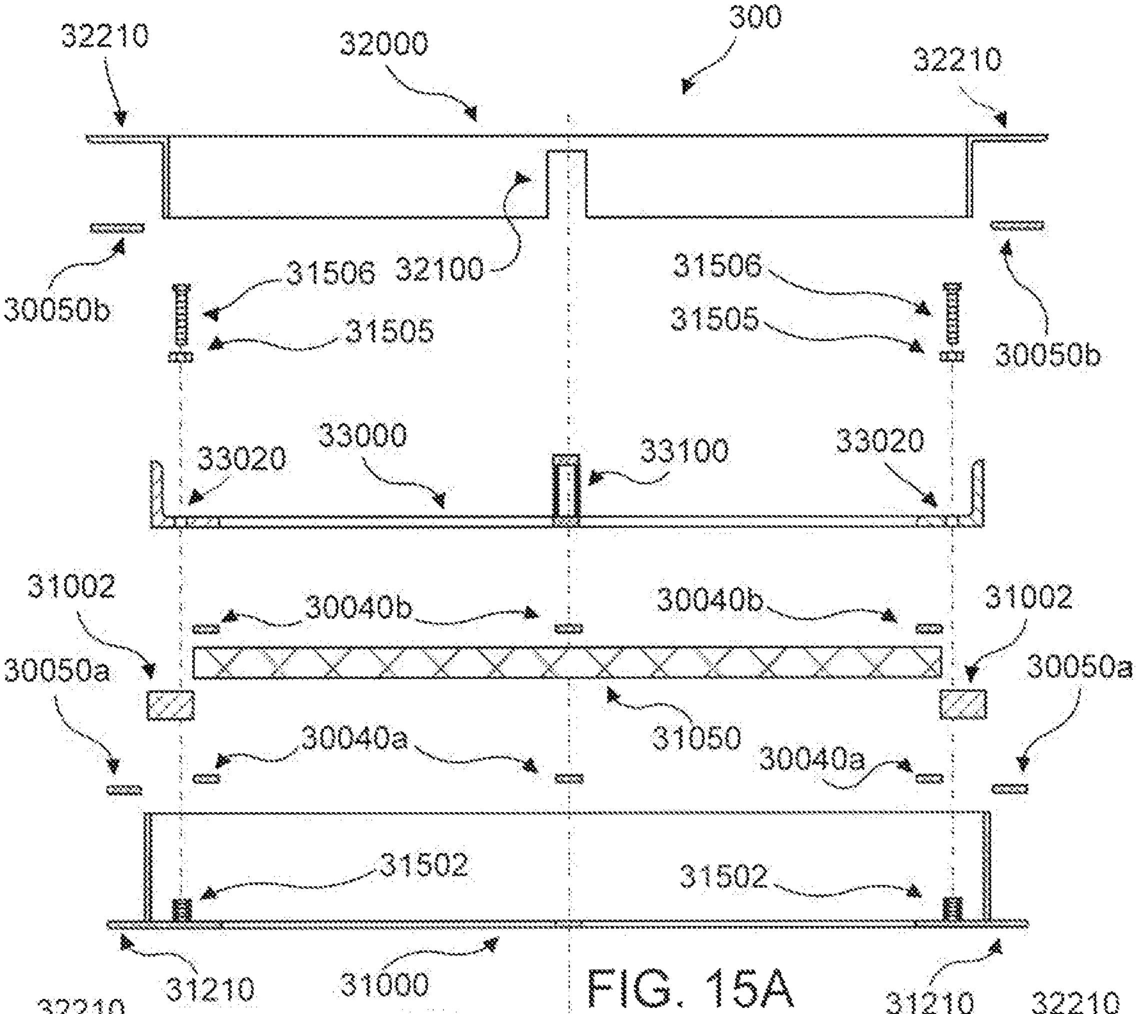
FIGS. 15A and 15B depict aspects of a Blast, Ballistic, And Entry Resistant Glazing-Heavy (BBERG-H) system, according to embodiments of the present invention.

FIG. 15A depicts aspects of a Blast, Ballistic, And Entry Resistant Glazing-Heavy (BBERG-H) system 300 according to embodiments of the present invention. BBERG-H system 300 is shown in an unassembled exploded (top) view, and includes an exterior frame assembly 31000, an interior frame assembly 32000, a middle frame assembly 33000, a glazing pane 31050 (e.g. comprising ballistic glazing), and a plurality of settling blocks 31002.

Figure 15B:
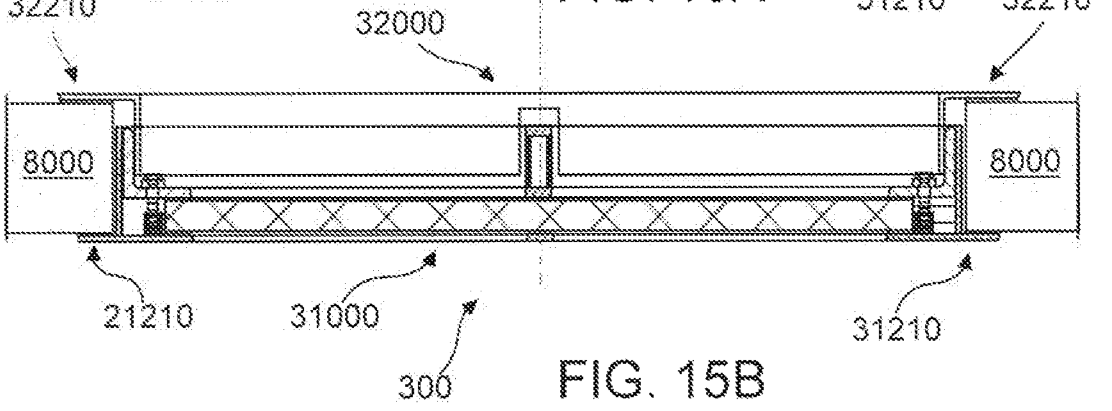

FIG. 15A provides an unassembled exploded cross-section (top) view of BBERG-H system 300. BBERG-H system 300 includes an exterior frame assembly 31000, an interior frame assembly 32000, a middle frame assembly 33000, a glazing pane 31050 (e.g. comprising ballistic glazing), and a plurality of settling blocks 31002. BBERG-H system 300 further includes an exterior gasket 30050*a*, an exterior glazing gasket 30040*a*, an interior glazing gasket 30040*b*, and an interior gasket 30050*b*. Exterior frame assembly 31000 also includes a plurality of threaded intermediate sleeves 31502 that are configured to receive threaded portions of respective threaded bolts 31506. Upon assembly of BBERG-H system 300 (as depicted in FIG. 15B), bolts 31506 pass through washers 31505, through apertures 33020 in middle frame assembly 33000, and into intermediate sleeves 31502. Interior frame assembly 32000 includes vertical grooves 32100 that are configured to receive vertical hollow structural section 33100 of middle frame assembly 33000.

FIG. 15B provides an assembled cross-section (top) view of BBERG-H system 300. Exterior frame assembly 31000 includes a peripheral flange 31210, and interior frame assembly 32000 includes a peripheral flange 32210. Hence, when BBERG-H system 300 is assembled, for example as depicted in FIG. 15B, exterior gasket 30050*a* is positioned between peripheral flange 31210 and wall 8000, and interior gasket 30050*b* is positioned between peripheral flange 32210 and wall 8000. FIG. 15B depicts an example where a BBERG-H system 300 is assembled and installed in the wall 8000 of a building.

Figure 16:
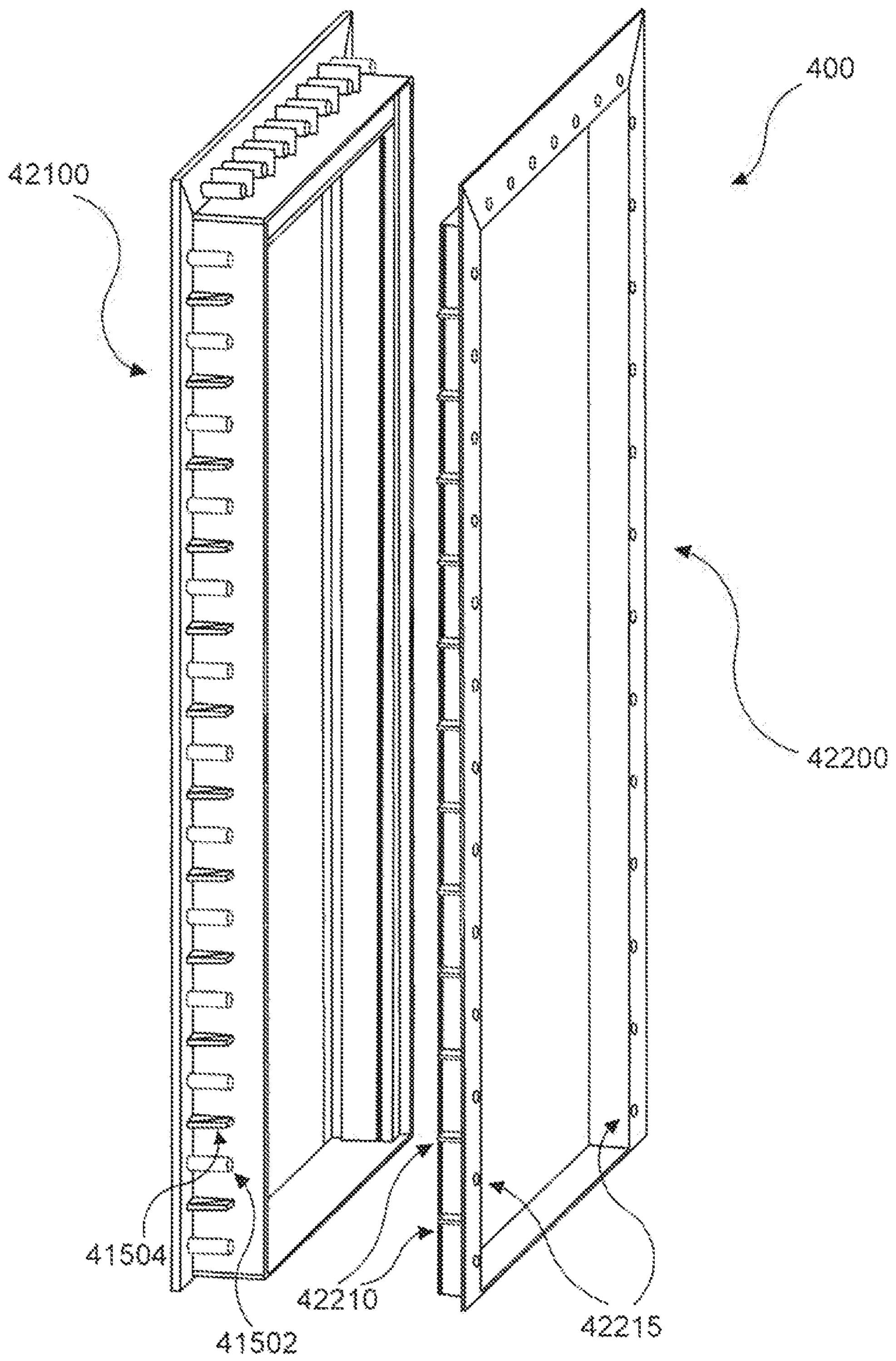
FIG. 16 depicts aspects of a Blast, Ballistic, And Entry Resistant Door (BBERD) system, according to embodiments of the present invention.

FIG. 16 depicts aspects of a Blast, Ballistic, And Entry Resistant Door (BBERD) system 400 according to embodiments of the present invention. BBERD system 400 is shown in an unassembled exploded (perspective) view, and includes an exterior frame assembly 42100 and an interior frame assembly 42200. Interior frame assembly 42200 includes apertures 42215 and plates 42210, and exterior frame assembly 42100 includes corresponding threaded sleeves 41502 and plates 41504.

Figure 17A:
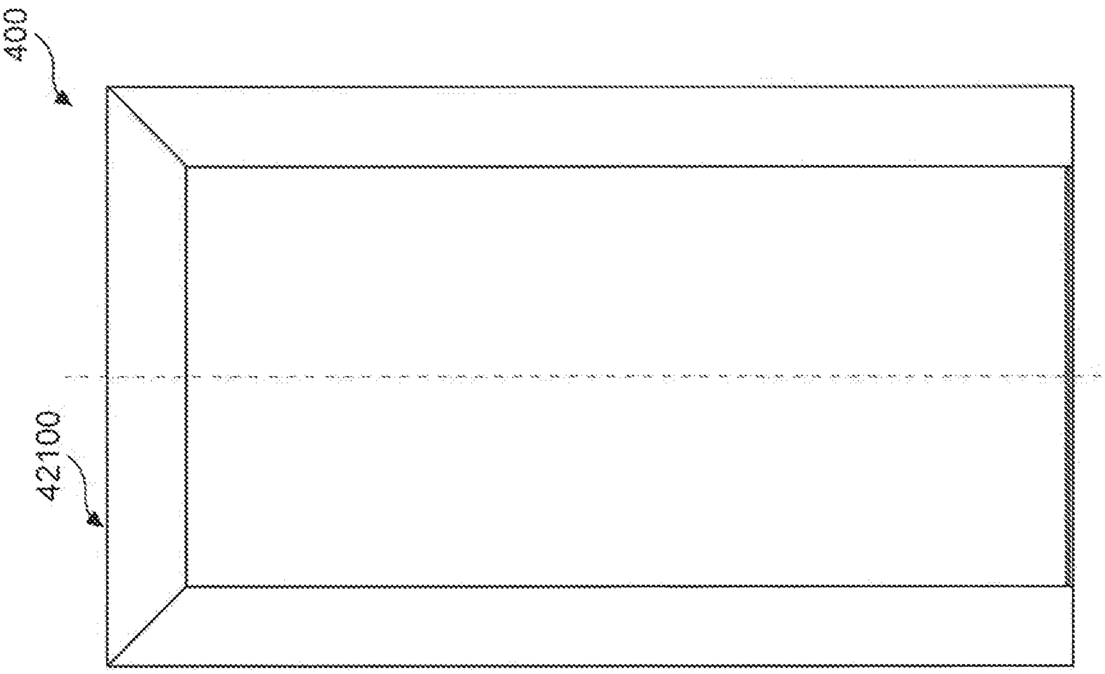
FIGS. 17A, 17B, and 17C depict aspects of a Blast, Ballistic, And Entry Resistant Door (BBERD) system, according to embodiments of the present invention.
Figure 17B:
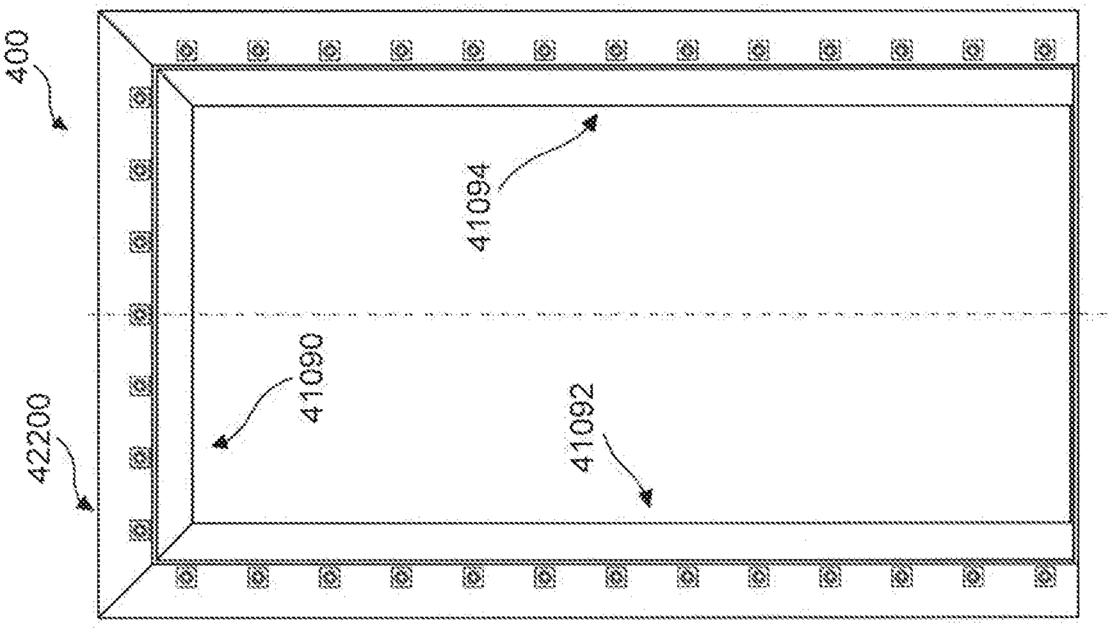

FIG. 17A provides an elevation view, as seen from a building exterior, of BBERD system 400. As shown here, exterior frame assembly 42100 is visible from the outside of the building. FIG. 17B provides an elevation view, as seen from a building interior, of BBERD system 400. As shown here, interior frame assembly 42200 is visible from the inside of the building. Additional features of BBERD system 400 which may be visible from the inside of the building include an upper horizontal hollow structural section 41090 of exterior frame assembly 41000, a first vertical hollow structural section 41092 of exterior frame assembly 41000, and a second vertical hollow structural section 41094 of exterior frame assembly 41000.

Figure 17C:
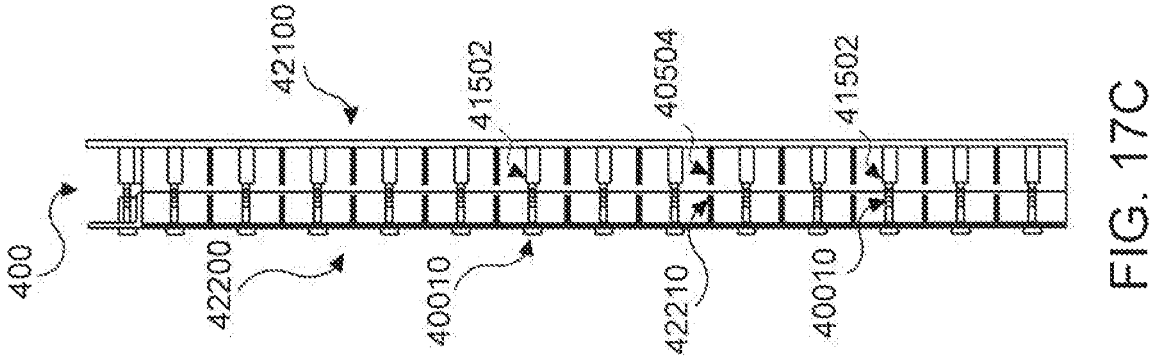

FIG. 17C provides an elevation cross-section view of BBERD system 400. BBERD system 400 includes an exterior frame assembly 42100, an interior frame assembly 42200, and threaded bolts 40010. Interior frame assembly 42200 includes plates 42210 and apertures (not shown) configured to receive threaded bolts 40010. Exterior frame assembly 42100 includes plates 40504 which correspond to plates 42210 of interior frame assembly 42200. Advantageously, the plates 40504, 42210, can help to keep the respective frame assemblies straight and/or rigid, and plates 40504 can also operate as spacers or spacer plates, for example by extending slightly beyond the threaded sleeves 41502, so that the threaded sleeves 41502 do not contact the side of the wall onto which the system 400 is installed (which could lead to breakage of or damage to the threaded sleeves). Exterior frame assembly 42100 also includes threaded sleeves 41502 which correspond to apertures (not shown) of interior frame assembly 42200 and which are configured to receive threaded bolts 40010.

Figure 18A:
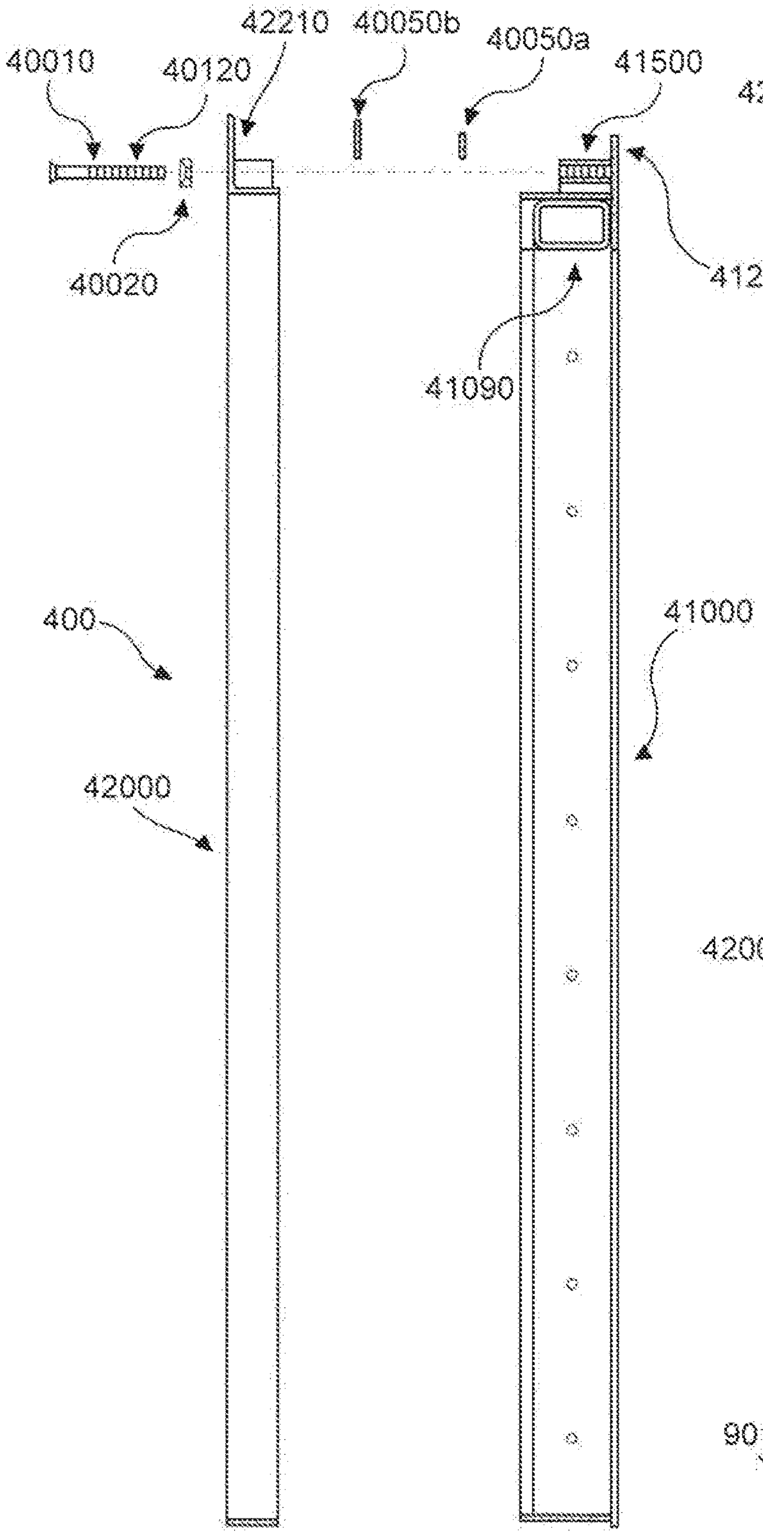
FIGS. 18A and 18B depict aspects of a Blast, Ballistic, And Entry Resistant Door (BBERD) system, according to embodiments of the present invention.
Figure 18B:
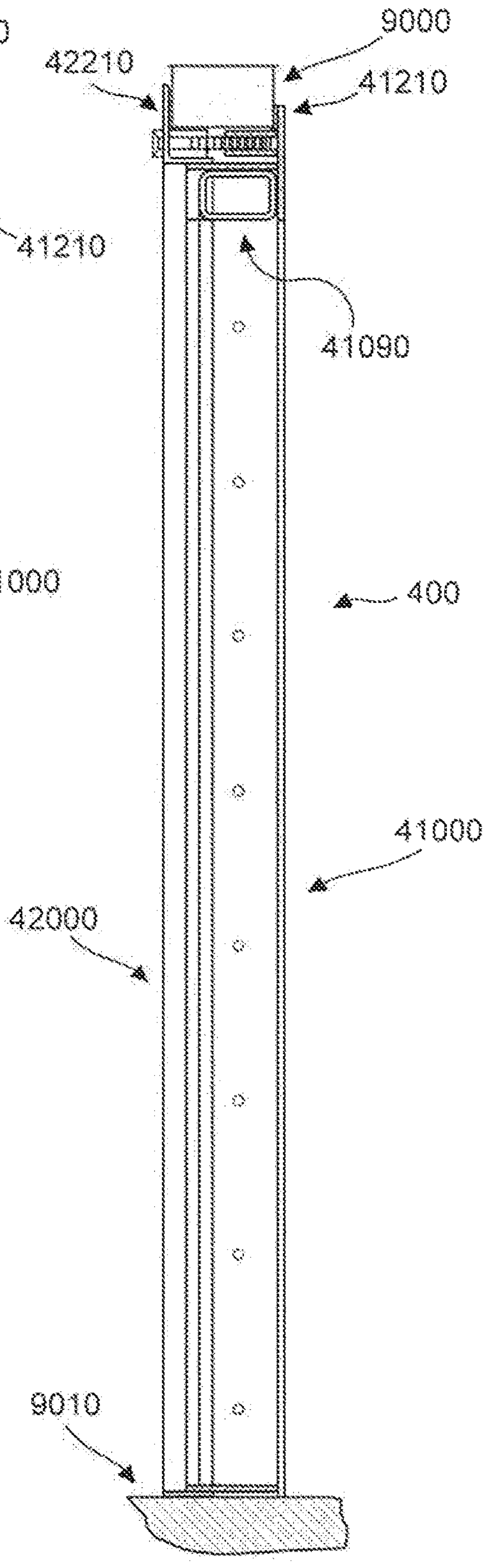

FIG. 18A provides an unassembled exploded cross-section (side) view of BBERD system 400. BBERD system 400 includes an exterior frame assembly 41000 and an interior frame assembly 42000. As illustrated here, an exterior frame assembly 41000 includes threaded sleeves 41500 that are configured to receive threaded portions 40120 of respective threaded bolts 40010. Interior frame assembly 42000 includes apertures (not shown) that are adapted to receive threaded bolts 40010 therethrough. Upon assembly of BBERD system 400 (as depicted in FIG. 18B), bolts 40010 pass through washers 40020, through apertures (not shown) in interior frame assembly 42000, and into sleeves 41500. As depicted in FIG. 18A. BBERD system 400 further includes an exterior gasket 40050*a* and an interior gasket 40050*b*, and exterior frame assembly 41000 further includes an upper hollow structural section 41090.

FIG. 18B provides an assembled cross-section (side) view of BBERD system 400. Exterior frame assembly 41000 includes a peripheral flange 41210, and interior frame assembly 42000 includes a peripheral flange 42210. Hence, when BBERD system 400 is assembled, for example as depicted in FIG. 18B, exterior gasket 40050*a* is positioned between peripheral flange 41210 and wall 9000, and interior gasket 40050*b* is positioned between peripheral flange 42210 and wall 9000 FIG. 18B depicts an example where a BBERD system 400 is assembled and installed in the wall 9000 of a building, and is positioned above the floor 9010 of the building and/or the ground.

Advantageously, due to the adjustability of the threaded bolts 40010 and/or the compressibility of the gaskets 40050*a* and/or 40050*b* (which can include a compressible material, such as rubber), the BBERD system 400 has a level of structural flexibility or tolerance which allows it to be installed in buildings where the wall thickness may not be entirely uniform. A peripheral flange 41210 of the exterior frame assembly 41000 can operate to prevent or inhibit the BBERD system 400 from being projected into the interior of the building in the event of an exterior blast. As another advantage, the gaskets can operate to provide friction between the system and the wall, so as to help hold the system in place relative to the wall (e.g. in the event of a blast, ballistic, and/or forced entry event).

Further advantageously, due to the placement and orientation of the threaded sleeves 41500, it is possible to secure the system 400 to the building without having any bolts and/or nuts exposed on the exterior of the wall 9000.

Figure 19A:
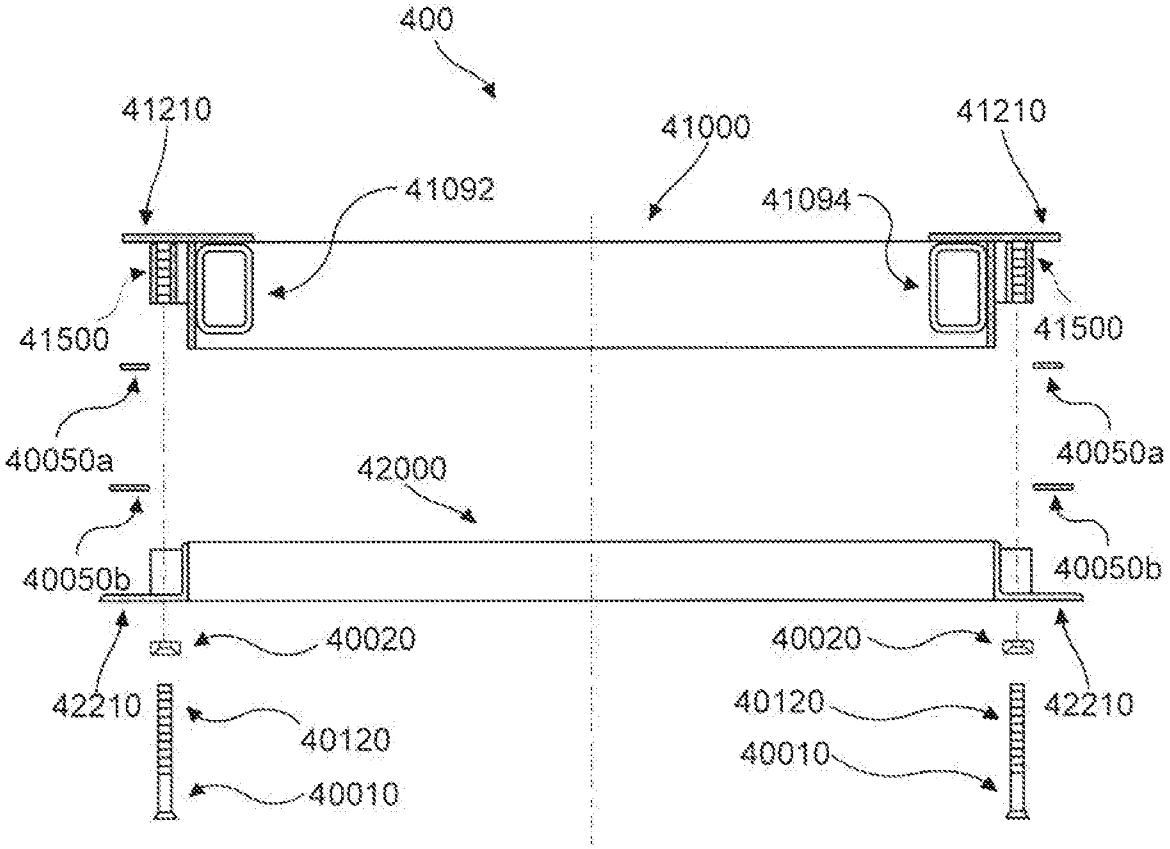
FIGS. 19A and 19B depict aspects of a Blast, Ballistic, And Entry Resistant Door (BBERD) system, according to embodiments of the present invention.
Figure 19B:
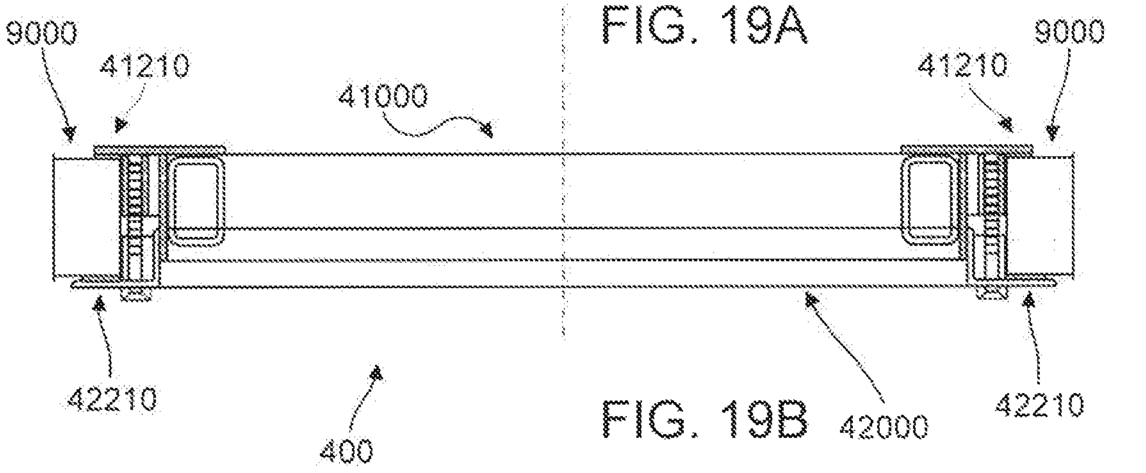

FIG. 19A provides an unassembled exploded cross-section (top) view of BBERD system 400. BBERD system 400 includes an exterior frame assembly 41000 and an interior frame assembly 42000. As illustrated here, an exterior frame assembly 41000 includes threaded sleeves 41500 that are configured to receive threaded portions 40120 of respective threaded bolts 40010. Interior frame assembly 42000 includes apertures (not shown) that are adapted to receive threaded bolts 40010 therethrough. Upon assembly of BBERD system 400 (as depicted in FIG. 19B), bolts 40010 pass through washers 40020, through apertures (not shown) in interior frame assembly 42000, and into sleeves 41050. As depicted in FIG. 19A, BBERD system 400 further includes an exterior gasket 40050*a* and an interior gasket 40050*b*, and exterior frame assembly 41000 further includes a first vertical hollow structural section 41092, and a second vertical hollow structural section 41094.

FIG. 19B provides an assembled cross-section (top) view of BBERD system 400. Exterior frame assembly 41000 includes a peripheral flange 41210, and interior frame assembly 42000 includes a peripheral flange 42210. Hence, when BBERD system 400 is assembled, for example as depicted in FIG. 19B, exterior gasket 40050*a* is positioned between peripheral flange 41210 and wall 9000, and interior gasket 40050*b* is positioned between peripheral flange 42210 and wall 9000. FIG. 19B depicts an example where a BBERD system 400 is assembled and installed in the wall 9000 of a building.

Figure 20A:
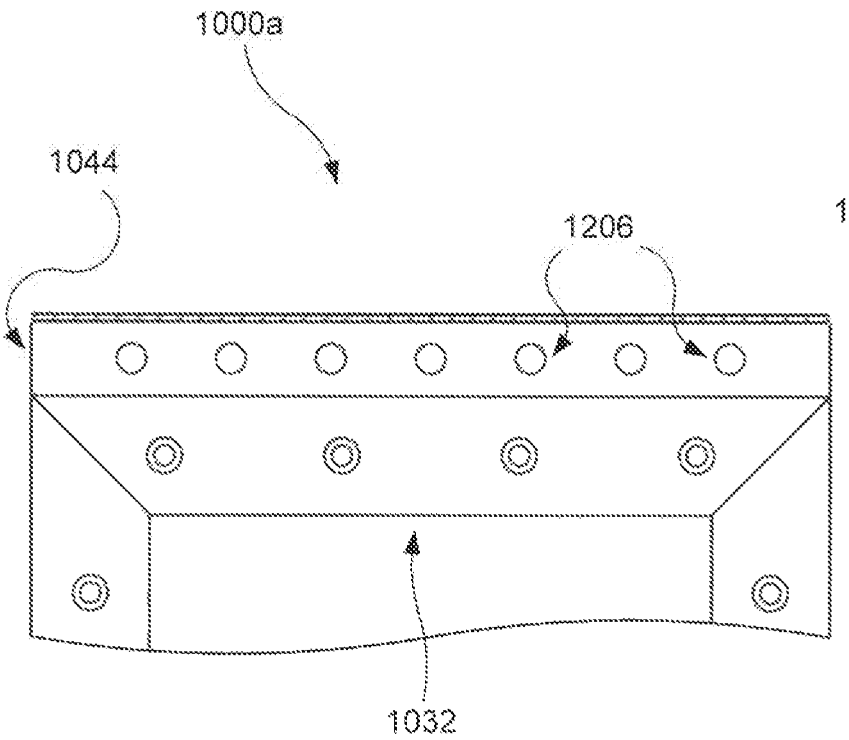
FIGS. 20A and 20B depict aspects of a Blast, Ballistic, And Entry Resistant Operable Window (BBROW) system, according to embodiments of the present invention.
Figure 20B:
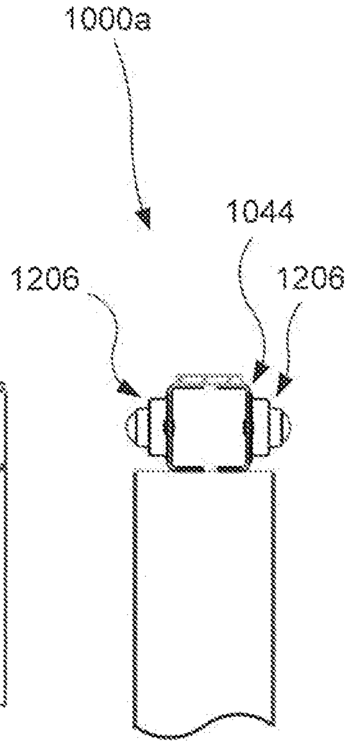

FIG. 20A depicts aspects of a first (e.g. exterior) sliding glazing panel assembly 1000*a* of an upper portion of a Blast, Ballistic, And Entry Resistant Operable Window (BBROW) system according to embodiments of the present invention. A sliding interior glazing panel assembly (not shown here) could have similar or equivalent features. As illustrated here, the sliding glazing panel assembly 1000*a* includes a plurality of ball transfer units 1206, which may be mounted on or coupled with a support 1044 such as a hollow structural section. The sliding glazing panel assembly 1000*a* also includes a rectangular glazing support 1032, e.g. of an exterior glazing frame. The ball transfer units 1206 can be configured for sliding engagement with an upper raceway of an exterior frame assembly as discussed elsewhere herein, for example with reference to FIGS. 4, 5A, and 5B. FIG. 20B depicts aspects of a first (e.g. exterior) sliding glazing panel assembly 1000*a* of an upper portion of a Blast, Ballistic, And Entry Resistant Operable Window (BBROW) system according to embodiments of the present invention. A sliding interior glazing panel assembly (not shown here) could have similar or equivalent features. As illustrated here, the sliding glazing panel assembly 1000*a* includes a plurality of ball transfer units 1206, which may be mounted on or coupled with a support 1044 such as a hollow structural section. The sliding glazing panel assembly 1000*a* also includes a rectangular glazing support 1042, e.g. of an interior glazing frame. The ball transfer units 1206 can be configured for sliding engagement with an upper raceway of an exterior frame assembly as discussed elsewhere herein, for example with reference to FIGS. 4, 5A, and 5B. As shown in FIG. 20B, the ball transfer units 1206 can face toward both the interior direction and the exterior direction, in contrast the ball transfer units shown in FIGS. 1, 2, and 4 which face toward the upward direction.

Figure 21:
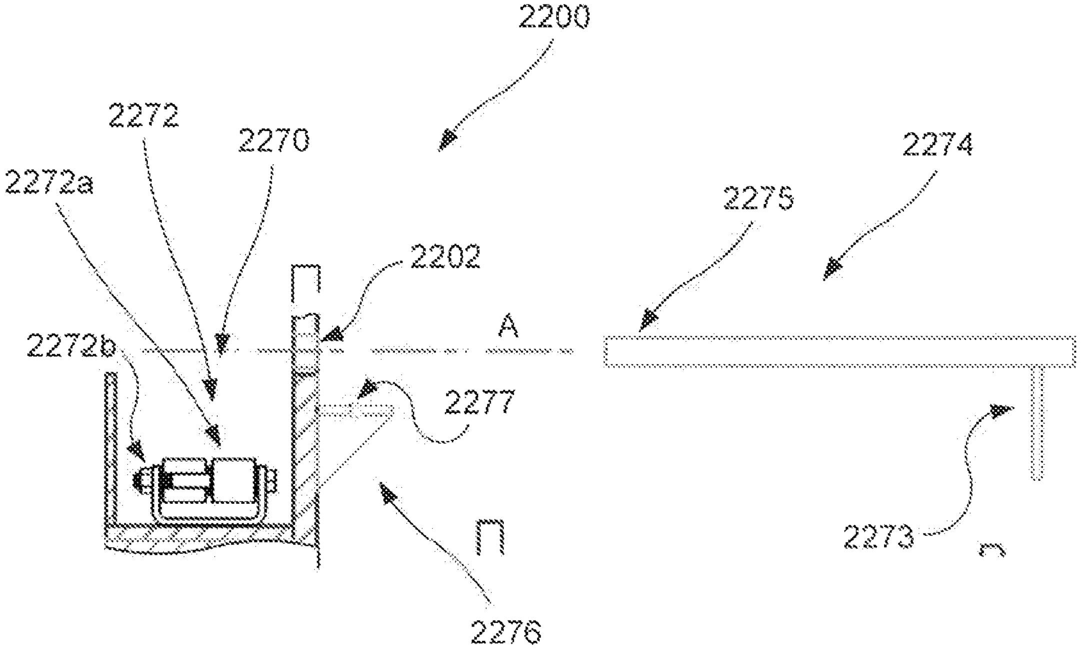
FIG. 21 depicts aspects of a Blast, Ballistic, And Entry Resistant Operable Window (BBROW) system, according to embodiments of the present invention.

FIG. 21 depicts aspects of an interior frame assembly 2200 (partial view) of a Blast, Ballistic, And Entry Resistant Operable Window (BBROW) system. The interior frame assembly 2200 includes a lower raceway 2270 configured to sliding receive or support a lower portion of an interior or second glazing panel assembly (not shown). As illustrated in FIG. 21, the interior frame assembly 2200 also includes a roller mechanism 2272 coupled with the bottom of the raceway 2270. The roller mechanism 2272 can include a roller barrel 2272*a* rotatably mounted with a roller axle (e.g. nut and bolt combination) 2272*b*. In operation, the interior or second glazing panel assembly can slide within the raceway 2270 while resting upon or otherwise in contact with the roller mechanism 2272. The BBROW system also includes a latch pin 2274 and a latch bracket 2276. As shown here, the interior frame assembly 2200 includes a hole or aperture 2202 that is configured to receive an insertion rod 2275 of the latch pin 2274 along axis A. Once the latch pin 2274 has been inserted through the aperture 2202, and optionally through similar corresponding apertures of a first (e.g. exterior) sliding glazing panel assembly and/or a second (e.g. interior) sliding glazing panel assembly (e.g. when either or both of the glazing panel assemblies are placed in the closed position), the latch pin 2274 can be rotated about the axis A, so that a locking rod 2273 of the latch pin 2274 is slotted into or otherwise engaged with an aperture or receiving mechanism 2277 of the latch bracket 2276. In this way, when the latch pin 2274 is engaged with the latch bracket 2276, the latch pin is prevented or inhibited from moving horizontally, and the latch pin and latch bracket can help to keep the sliding glazing panels in place during a ballistic, blast, or forced entry event, or can help to otherwise prevent or inhibit the sliding glazing panels from opening or being jammed during a during a ballistic, blast, or forced entry event.

Any of the ball transfer unit, roller mechanism, and/or latch pin and latch bracket features depicted in FIGS. 20A, 20B, and 21 can be incorporated in any of the Blast, Ballistic, And Entry Resistant Operable Window (BBROW) system embodiments disclosed herein.

Embodiments of the present invention encompass methods for installing window, glazing, and/or door systems in a building. In some cases, steel frame assemblies and glazing panels can be individually crated and shipped to an on-site installation location. In some cases, glazing panels and gaskets can be placed into frames in the field. Glazing panels can be relatively heavy (e.g. 100 or 200 pounds) and can be lifted using a forklift with a telescoping boom attachment and a glass plate vacuum lifting device. Steel frame assemblies can be lifted and positioned into place using a 2200 pound capacity lifting magnet.

In some cases, rubber setting blocks and gaskets can be pre-cut to desired drawing dimensions and labeled prior to arriving on site. In some cases, one or more setting blocks can be trimmed in the field to fit in between the frame and the glazing panel. In some cases, spray adhesive can be applied to the rubber gaskets to help them stick to the steel frames until the system is bolted together and compressed around the wall front opening. In some cases, one or more threaded sleeves can be chased with a tap prior to the frames being installed to remove any welding residue or debris.

According to some embodiments, exterior frame assemblies of the systems can be lifted and positioned into the wall front opening using a forklift and a locking vertical plate clamp. In some cases, interior frame assemblies of the systems can be brought into the structure using a separate forklift. In some cases, a locking vertical plate clamp can be attached to the inner frame assemblies and then lifted and moved around the structure using a reverse hydraulic crane.

In some embodiments, once the outer and inner frame assemblies are lined up, one or more bolts can be started and tightened to hold the frame assemblies in place. In some cases, second forklift can be used to hold the outer frame assembly while the vertical plate clamp was removed so the outer frame assembly can be pushed inward and flush with the wall front. In some cases, a several bolts are started and tightened down, the plate clamp attached to the reverse hydraulic crane can be removed. In some cases, the remaining bolts can be started and tightened down to bring the two frame assemblies together and compressed around the wall front opening. In some cases, one or more bolts can be pre-torqued to 300 in-lb during an initial installation, and then later torqued to 1200 in-lb.

In some cases, exterior and interior steel plate straps of a BBERG system may be warped and therefore extra rubber gaskets can be placed in between the straps and the glazing panel. In some cases, extra gaskets and clear silicon can be placed in between the inner and outer BBROW system frames to fill in the gap.

In some cases, a glazing panel may include multiple layers of materials. For example, a glazing panel may include (traversing from the attack side to the safe side) a first layer of glass, a second layer of urethane, a third layer of glass, a fourth layer of urethane, a fifth layer of glass, a sixth layer of urethane, a seventh layer of glass, an eighth layer of urethane, a ninth layer of glass, a tenth layer of urethane, and an eleventh layer of mar-resistant polycarbonate.

In blast testing experiments, exemplary window, glazing, and/or door system embodiments displayed no sheared bolts and no glass debris was observed inside of the building. Exemplary window, glazing, and/or door system embodiments were also observed to remain compressed around the wall front opening following the blast test. In exemplary BBROW system embodiments, no damage was observed to the window panel sliding elements.

It is appreciated that any of the operable window embodiments disclosed herein, such as the Blast, Ballistic, And Entry Resistant Operable Window (BBROW) systems and methods, may include one or more features of any of the other embodiments disclosed herein, such as the Blast, Ballistic, And Entry Resistant Glazing (BBERG) systems and methods, the Blast, Ballistic, And Entry Resistant Glazing-Heavy (BBERG-H) systems and methods, and the Blast, Ballistic, And Entry Resistant Door (BBERD) systems and methods. Similarly, it is appreciated that any of the compression frame embodiments disclosed herein, such as the Blast, Ballistic, And Entry Resistant Operable Window (BBROW) systems and methods, the Blast, Ballistic, And Entry Resistant Glazing (BBERG) systems and methods, the Blast, Ballistic, And Entry Resistant Glazing-Heavy (BBERG-H) systems and methods, and the Blast, Ballistic, And Entry Resistant Door (BBERD) systems and methods, may include one or more features of any of the other embodiments disclosed herein, such as the Blast, Ballistic, And Entry Resistant Operable Window (BBROW) systems and methods, the Blast, Ballistic, And Entry Resistant Glazing (BBERG) systems and methods, the Blast, Ballistic, And Entry Resistant Glazing-Heavy (BBERG-H) systems and methods, and the Blast, Ballistic, And Entry Resistant Door (BBERD) systems and methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A blast, ballistic, and entry resistant operable window system for installation in a wall of a building, comprising:

a sliding exterior glazing panel assembly having an exterior glazing frame, an interior glazing frame coupled with the exterior glazing frame, a glazing panel disposed between the exterior glazing frame and the interior glazing frame, a plurality of settling blocks in contact with the glazing panel, a plurality of upper exterior ball transfer units, and a plurality of lower exterior ball transfer units;

a sliding interior glazing panel assembly having an exterior glazing frame, an interior glazing frame coupled with the exterior glazing frame, a glazing panel disposed between the exterior glazing frame and the interior glazing frame, a plurality of settling blocks in contact with the glazing panel, a plurality of upper interior ball transfer units, and a plurality of lower interior ball transfer units;

an exterior frame assembly having an upper raceway that receives the plurality of upper exterior ball transfer units of the exterior glazing panel assembly and a lower raceway that receives the plurality of lower exterior ball transfer units of the exterior glazing panel assembly;

an interior frame assembly having an upper raceway that receives the plurality of upper interior ball transfer units of the interior glazing panel assembly and a lower raceway that receives the plurality of lower interior ball transfer units of the interior glazing panel assembly;

an exterior gasket configured for placement between the exterior frame assembly and the wall of the building;

a central gasket configured for placement between the exterior frame assembly and the interior frame assembly; and an interior gasket configured for placement between the interior frame assembly and the wall of the building.

2. The blast, ballistic, and entry resistant operable window system according to claim 1, wherein the plurality of upper exterior ball transfer units of the sliding exterior glazing panel assembly are coupled with an upper portion of the interior glazing frame of the sliding exterior glazing panel assembly.

3. The blast, ballistic, and entry resistant operable window system according to claim 1, wherein the sliding exterior glazing panel assembly further comprises an upper hollow structural section coupled with an upper portion of the interior glazing frame, and wherein the plurality of upper exterior ball transfer units of the sliding exterior glazing panel assembly are coupled with the upper hollow structural section of the sliding exterior glazing panel assembly.

4. The blast, ballistic, and entry resistant operable window system according to claim 1, wherein the sliding exterior glazing panel assembly further comprises a polytetrafluoroethylene pad coupled with an upper portion of the interior glazing frame of the sliding exterior glazing panel assembly.

5. The blast, ballistic, and entry resistant operable window system according to claim 1, wherein the sliding exterior glazing panel assembly further comprises an upper hollow structural section coupled with an upper portion of the interior glazing frame, and wherein the polytetrafluoroethylene pad of the sliding exterior glazing panel assembly is coupled with the upper hollow structural section of the sliding exterior glazing panel assembly.

6. The blast, ballistic, and entry resistant operable window system according to claim 1, wherein the sliding exterior glazing panel assembly further comprises an upper hollow structural section coupled with an upper portion of the interior glazing frame, and a polytetrafluoroethylene pad coupled with the upper hollow structural section of the sliding exterior glazing panel assembly, and wherein the plurality of upper exterior ball transfer units of the sliding exterior glazing panel assembly are coupled with the upper hollow structural section of the sliding exterior glazing panel assembly.

7. The blast, ballistic, and entry resistant operable window system according to claim 1, wherein the upper raceway of the exterior frame assembly comprises a raceway track that receives the plurality of upper exterior ball transfer units of the exterior glazing panel assembly.

8. The blast, ballistic, and entry resistant operable window system according to claim 1, wherein the plurality of settling blocks of the sliding exterior glazing panel assembly are disposed along a top edge of the glazing panel of the sliding exterior glazing panel assembly, a bottom edge of the glazing panel of the sliding exterior glazing panel assembly, a first side edge of the glazing panel of the sliding exterior glazing panel assembly, and a second side edge of the glazing panel of the sliding exterior glazing panel assembly opposing the first side edge of the glazing panel of the sliding exterior glazing panel assembly.

9. The blast, ballistic, and entry resistant operable window system according to claim 1, further comprising a plurality of threaded bolts, wherein the exterior frame assembly further comprises a peripheral flange and a plurality of threaded sleeves configured to threadingly receive the plurality of threaded bolts, wherein the interior frame assembly further comprises a peripheral flange and a plurality of apertures configured to receive the plurality of bolts therethrough, wherein the exterior gasket is configured for placement between the peripheral flange of the exterior frame assembly and an exterior surface of the wall of the building, wherein the interior gasket is configured for placement between the peripheral flange of the interior frame assembly and an interior surface of the wall of the building, and wherein the peripheral flange of the exterior frame assembly and the peripheral flange of the interior frame assembly operate to apply a compression force to the wall of the building, the exterior gasket, and the interior gasket, when the plurality of threaded bolts are torque tightened into the plurality of threaded sleeves.

10. A blast, ballistic, and entry resistant operable window system for installation in a wall of a building, comprising:
- a sliding exterior glazing panel assembly having an exterior glazing frame, an interior glazing frame coupled with the exterior glazing frame, a glazing panel disposed between the exterior glazing frame and the interior glazing frame, a plurality of settling blocks in contact with the glazing panel, a plurality of upper exterior ball transfer units, and a plurality of lower exterior ball transfer units;
- a sliding interior glazing panel assembly having an exterior glazing frame, an interior glazing frame coupled with the exterior glazing frame, a glazing panel disposed between the exterior glazing frame and the interior glazing frame, a plurality of settling blocks in contact with the glazing panel, a plurality of upper interior ball transfer units, and a plurality of lower interior ball transfer units;
- an exterior frame assembly having an upper raceway that receives the plurality of upper exterior ball transfer units of the exterior glazing panel assembly, a lower raceway that receives the plurality of lower exterior ball transfer units of the exterior glazing panel assembly, and a plurality of plates;
- an interior frame assembly having an upper raceway that receives the plurality of upper interior ball transfer units of the interior glazing panel assembly, a lower raceway that receives the plurality of lower interior ball transfer units of the interior glazing panel assembly, and a plurality of plates;
- an exterior gasket configured for placement between the exterior frame assembly and the wall of the building;
- a central gasket configured for placement between the exterior frame assembly and the interior frame assembly; and
- an interior gasket configured for placement between the interior frame assembly and the wall of the building,
- wherein the plurality of plates of the interior frame assembly are positionally aligned with the plurality of plates of the exterior frame assembly when the blast, ballistic, and entry resistant operable window system is installed in the wall of the building.

11. A method of installing a blast, ballistic, and entry resistant operable window system in a wall of a building, comprising:
- placing a sliding exterior glazing panel assembly of the system into an exterior frame assembly of the system, the sliding exterior glazing panel assembly having an exterior glazing frame, an interior glazing frame coupled with the exterior glazing frame, a glazing panel disposed between the exterior glazing frame and the interior glazing frame, a plurality of settling blocks in contact with the glazing panel, a plurality of upper exterior ball transfer units, and a plurality of lower exterior ball transfer units, and the exterior frame assembly having an upper raceway that receives the plurality of upper exterior ball transfer units of the exterior glazing panel assembly and a lower raceway that receives the plurality of lower exterior ball transfer units of the exterior glazing panel assembly;
- placing a sliding interior glazing panel assembly of the system into an interior frame assembly of the system, the sliding interior glazing panel assembly having an exterior glazing frame, an interior glazing frame coupled with the exterior glazing frame, a glazing panel disposed between the exterior glazing frame and the interior glazing frame, a plurality of settling blocks in contact with the glazing panel, a plurality of upper interior ball transfer units, and a plurality of lower interior ball transfer units, and the interior frame assembly having an upper raceway that receives the plurality of upper interior ball transfer units of the interior glazing panel assembly and a lower raceway that receives the plurality of lower interior ball transfer units of the interior glazing panel assembly;
- positioning the exterior frame assembly exterior to the wall of the building;
- positioning the interior frame assembly inferior to the wall of the building;
- placing a central gasket between the exterior frame assembly and the interior frame assembly;
- placing an exterior gasket between the exterior frame assembly and an exterior surface of the wall of the building;
- placing an interior gasket between the interior frame assembly and an interior surface of the wall of the building; and
- coupling the exterior frame assembly with the interior frame assembly.

12. The method according to claim 11, wherein the plurality of upper exterior ball transfer units of the sliding exterior glazing panel assembly are coupled with an upper portion of the interior glazing frame of the sliding exterior glazing panel assembly.

13. The method according to claim 11, wherein the sliding exterior glazing panel assembly further comprises an upper hollow structural section coupled with an upper portion of the interior glazing frame, and wherein the plurality of upper exterior ball transfer units of the sliding exterior glazing panel assembly are coupled with the upper hollow structural section of the sliding exterior glazing panel assembly.

14. The method according to claim 11, wherein the sliding exterior glazing panel assembly further comprises a polytetrafluoroethylene pad coupled with an upper portion of the interior glazing frame of the sliding exterior glazing panel assembly.

15. The method according to claim 11, wherein the sliding exterior glazing panel assembly further comprises an upper hollow structural section coupled with an upper portion of the interior glazing frame, and wherein the polytetrafluoroethylene pad of the sliding exterior glazing panel assembly is coupled with the upper hollow structural section of the sliding exterior glazing panel assembly.

16. The method according to claim 11, wherein the sliding exterior glazing panel assembly further comprises an upper hollow structural section coupled with an upper portion of the interior glazing frame, and a polytetrafluoroethylene pad coupled with the upper hollow structural section of the sliding exterior glazing panel assembly, and wherein the plurality of upper exterior ball transfer units of the sliding exterior glazing panel assembly are coupled with the upper hollow structural section of the sliding exterior glazing panel assembly.

17. The method according to claim 11, wherein the upper raceway of the exterior frame assembly comprises a raceway track that receives the plurality of upper exterior ball transfer units of the exterior glazing panel assembly.

18. The method according to claim 11, wherein the plurality of settling blocks of the sliding exterior glazing panel assembly are disposed along a top edge of the glazing panel of the sliding exterior glazing panel assembly, a bottom edge of the glazing panel of the sliding exterior glazing panel assembly, a first side edge of the glazing panel of the sliding exterior glazing panel assembly, and a second side edge of the glazing panel of the sliding exterior glazing panel assembly opposing the first side edge of the glazing panel of the sliding exterior glazing panel assembly.

19. The method according to claim 11, wherein the exterior frame assembly further comprises a peripheral flange, wherein the interior frame assembly further comprises a peripheral flange, wherein the exterior gasket is configured for placement between the peripheral flange of the exterior frame assembly and the exterior surface of the wall of the building, and wherein the interior gasket is configured for placement between the peripheral flange of the interior frame assembly and the interior surface of the wall of the building.

20. The method according to claim 11, wherein the system further comprises comprising a plurality of threaded bolts, wherein the exterior frame assembly further comprises a peripheral flange and a plurality of threaded sleeves configured to threadingly receive the plurality of threaded bolts, wherein the interior frame assembly further comprises a peripheral flange and a plurality of apertures configured to receive the plurality of bolts therethrough, and wherein the method further comprises torque tightening the plurality of threaded bolts into the plurality of threaded sleeves so as to apply a compression force to the wall of the building between the peripheral flange of the exterior frame assembly and the peripheral flange of the interior frame assembly.

* * * * *